(12) United States Patent
Resch et al.

(10) Patent No.: US 11,115,206 B2
(45) Date of Patent: Sep. 7, 2021

(54) ASSYMETRIC STRUCTURED KEY RECOVERING USING OBLIVIOUS PSEUDORANDOM FUNCTION

(71) Applicant: International Business Machines Corporation, Armonk, NY (US)

(72) Inventors: Jason K. Resch, Chicago, IL (US); Hugo M. Krawczyk, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 324 days.

(21) Appl. No.: 16/109,856

(22) Filed: Aug. 23, 2018

(65) Prior Publication Data

US 2020/0067707 A1 Feb. 27, 2020

(51) Int. Cl.
*H04L 9/08* (2006.01)

(52) U.S. Cl.
CPC .......... *H04L 9/0894* (2013.01); *H04L 9/0869* (2013.01)

(58) Field of Classification Search
USPC ....................................................... 380/286
See application file for complete search history.

(56) References Cited

U.S. PATENT DOCUMENTS

| | | |
|---|---|---|
| 3,323,163 A | 6/1967 | Goodnow |
| 5,564,106 A | 10/1996 | Puhl et al. |
| 5,991,414 A | 11/1999 | Garay et al. |
| 6,118,874 A | 9/2000 | Okamoto et al. |
| 6,411,715 B1 * | 6/2002 | Liskov ............... H04L 9/002 380/1 |
| 7,516,330 B2 | 4/2009 | Ellison et al. |
| 7,584,363 B2 | 9/2009 | Canard et al. |
| 8,468,368 B2 | 6/2013 | Gladwin et al. |

(Continued)

FOREIGN PATENT DOCUMENTS

WO 2017001972 1/2017

OTHER PUBLICATIONS

International Searching Authority; International Search Report and Written Opinion; International Application No. PCT/IB2019/051525; dated May 29, 2019; 8 pgs.

(Continued)

*Primary Examiner* — Eleni A Shiferaw
*Assistant Examiner* — Sakinah White Taylor
(74) *Attorney, Agent, or Firm* — Anthony England; Andrew D. Wright; Roberts Calderon Safran & Cole, P.C.

(57) ABSTRACT

A computing device implements a key management system (KMS), and includes an interface, memory, and processing circuitry that executes operational instructions to maintain structured key parameters and a generating procedure associated with associated with a structured key. The generating procedure produces the structured key from an Oblivious Pseudorandom Function (OPRF) output, and the structured key parameters. The computing device receives a blinded value associated with the structured key from a requesting computing device, processes the blinded value using an OPRF secret to generate a blinded OPRF output, and returns the blinded OPRF output, the generating procedure, and the structured key parameters to the requesting computing device, which uses that information to generate the requested structured key.

20 Claims, 14 Drawing Sheets

(56) References Cited

U.S. PATENT DOCUMENTS

| | | | |
|---|---|---|---|
| 8,538,029 | B2 | 9/2013 | Li et al. |
| 8,572,405 | B2 | 10/2013 | Kerschbaum |
| 9,049,011 | B1 | 6/2015 | Agrawal |
| 9,380,036 | B2 | 6/2016 | Parann-Nissany |
| 9,380,037 | B2 | 6/2016 | Parann-Nissany |
| 9,565,020 | B1 | 2/2017 | Camenisch |
| 9,712,320 | B1 | 7/2017 | Kiayias et al. |
| 10,061,715 | B2* | 8/2018 | Choi ............... G06F 12/1408 |
| 10,235,335 | B1 | 3/2019 | Speers |
| 2003/0012386 | A1 | 1/2003 | Kim et al. |
| 2005/0063545 | A1 | 3/2005 | Fujimoto et al. |
| 2005/0066174 | A1 | 3/2005 | Perlman |
| 2005/0066175 | A1 | 3/2005 | Perlman |
| 2009/0175442 | A1 | 7/2009 | Feng et al. |
| 2009/0287837 | A1 | 11/2009 | Felsher |
| 2011/0010549 | A1 | 1/2011 | Kolesnikov et al. |
| 2011/0055585 | A1 | 3/2011 | Lee |
| 2011/0126295 | A1 | 5/2011 | Resch |
| 2012/0121080 | A1 | 5/2012 | Kerschbaum |
| 2012/0330980 | A1 | 12/2012 | Rubin et al. |
| 2013/0205379 | A1 | 8/2013 | Kang |
| 2013/0279692 | A1 | 10/2013 | Bevan |
| 2013/0282438 | A1 | 10/2013 | Hunter et al. |
| 2014/0041039 | A1 | 2/2014 | Saldamli et al. |
| 2014/0115334 | A1 | 4/2014 | Resch et al. |
| 2014/0237623 | A1 | 8/2014 | Saldamli et al. |
| 2014/0349682 | A1 | 11/2014 | Nawaz |
| 2015/0117641 | A1* | 4/2015 | Carrillo De La Fuente ............... H04L 9/0822 380/44 |
| 2015/0161398 | A1 | 6/2015 | De Cristofaro et al. |
| 2015/0372811 | A1 | 12/2015 | Le Saint et al. |
| 2016/0057649 | A1 | 2/2016 | Kakadia et al. |
| 2016/0065370 | A1 | 3/2016 | Le Saint et al. |
| 2016/0218875 | A1 | 7/2016 | Le Saint et al. |
| 2016/0226790 | A1 | 8/2016 | Lee |
| 2016/0323102 | A1 | 11/2016 | Freudiger et al. |
| 2016/0328296 | A1 | 11/2016 | Abhijeet et al. |
| 2017/0154311 | A1 | 6/2017 | Lewis et al. |
| 2017/0177899 | A1 | 6/2017 | Ng et al. |
| 2017/0222801 | A1 | 8/2017 | Le Saint |
| 2017/0223008 | A1* | 8/2017 | Camenisch ............ H04L 9/0863 |
| 2018/0018286 | A1 | 1/2018 | Axnix |
| 2018/0076956 | A1 | 3/2018 | Camenisch |
| 2018/0157703 | A1 | 6/2018 | Wang et al. |
| 2018/0375652 | A1* | 12/2018 | Karame ............... H04L 9/30 |
| 2018/0375663 | A1 | 12/2018 | Le Saint |
| 2019/0109711 | A1 | 4/2019 | Gladwin |
| 2019/0327085 | A1* | 10/2019 | Patel ................... G06F 21/6209 |
| 2019/0342270 | A1 | 11/2019 | Laine et al. |
| 2019/0349191 | A1 | 11/2019 | Soriente et al. |
| 2019/0356649 | A1 | 11/2019 | Alwen |
| 2020/0242466 | A1* | 7/2020 | Mohassel ............ G06F 21/6254 |

OTHER PUBLICATIONS

Jarecki S., et al.; Efficient Oblivious Pseudorandom Function with Applications to Adaptive OT and Secure Computation of Set Intersection; Theory of Cryptography, TCC 2009; Lecture Notes in Computer Science, vol. 5444; 2009; 18 pgs.

Zhu, et al; LEAP: Efficient Security Mechanisms for Large-Scale Distributed Sensor Networks; ACM Transactions on Sensor Networks (TOSN) 2.4; 2006; pp. 500-528.

McGrew, et al.; Key Establishment in Large Dynamic Groups Using One-Way Function Trees; IEEE Transactions on Software Engineering 29.5; 2003; pp. 444-458.

National Institute of Standards and Technology; The NIST Definition of Cloud Computing; Special Publication 800-145; Dec. 13, 2016; pp. M-7 to M-13.

Kwon, Moonsang, and Yookun Cho. "Protecting Secret Keys with Blind Computation Service." Third International Workshop on Information Security Applications. 2002. (Year: 2002), 11 pages. U.S. Appl. No. 15/926,651.

Blaze, Matt. "Oblivious key escrow." International Workshop on Information Hiding. Springer, Berlin, Heidelberg, 1996. (Year: 1996), 9 pages. U.S. Appl. No. 15/926,651.

Burns, Jonathan, et al. "EC-OPRF: Oblivious Pseudorandom Functions using Elliptic Curves" IACR Cryptology ePrint Archive 2017 (2017): 111. (Year: 2017), 13 pages. U.S. Appl. No. 15/926,651.

NPL Search Results (Year: 2020), 2 pages. U.S. Appl. No. 15/926,651.

Office Action in U.S. Appl. No. 15/926,883 dated Jan. 21, 2020, 25 pages.

Office Action in U.S. Appl. No. 15/926,651 dated Jan. 23, 2020, 15 pages.

Office Action in U.S. Appl. No. 15/926,822 dated Feb. 20, 2020, 21 pages.

Bellare et al., "DupLESS: Server-aided encryption for deduplicated storage," USENIX Security Symposium, 2013 (Year: 2013). 17 pages. U.S. Appl. No. 15/926,883.

Notice of Allowance in U.S. Appl. No. 15/926,651 dated May 5, 2020, 18 pages.

Notice of Allowance in U.S. Appl. No. 15/926,883 dated Jun. 19, 2020, 12 pages.

Office Action in U.S. Appl. No. 16/112,224 dated Apr. 6, 2020, 8 pages.

List of IBM Patents or Patent Applications Treated as Related, Jul. 1, 2020, 1 page.

List of IBM Patents or Applications Treated as Related, Aug. 29, 2018, 2 pages.

Notice of Allowance in U.S. Appl. No. 16/112,224 dated Oct. 15, 2020, 7 pages.

Notice of Allowance in U.S. Appl. No. 15/926,651 dated Aug. 17, 2020, 10 pages.

Notice of Allowance in U.S. Appl. No. 15/926,822 dated Sep. 2, 2020, 9 pages.

Notice of Allowance in U.S. Appl. No. 15/926,883 dated Jun. 19, 2020, 7 pages.

Notice of Allowance in U.S. Appl. No. 15/926,883 dated Sep. 2, 2020, 8 pages.

Rabin, Michael O. "How to Exchange Secrets with Oblivious Transfer." IACR Cryptol. ePrint Arch. 2005.187 (2005). (Year: 2005), 26 pages.

Anonymous, NPL Search Results (Year: 2020), 1 page.

* cited by examiner

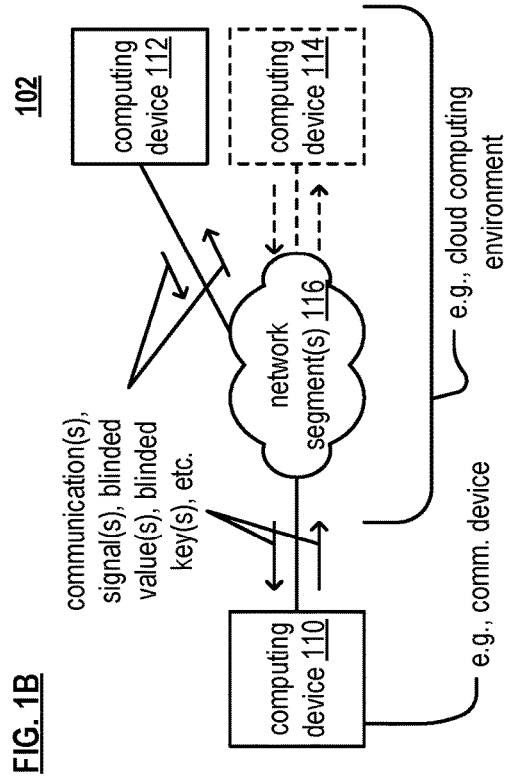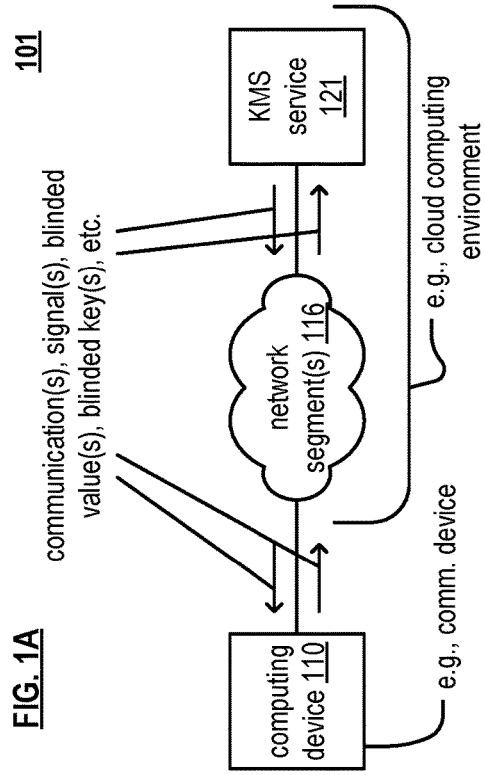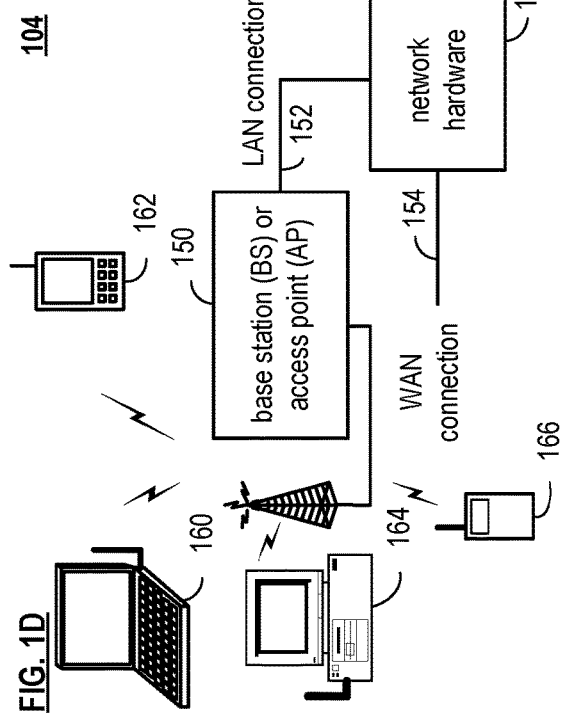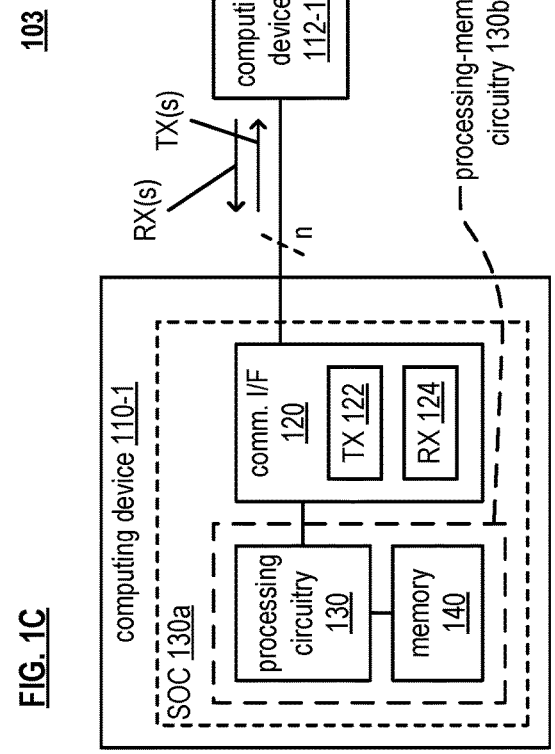

ASSYMETRIC STRUCTURED KEY RECOVERING USING OBLIVIOUS PSEUDORANDOM FUNCTION

BACKGROUND

This invention relates to security, encryption, and key management, and more specifically, to security, encryption, and key management in accordance with operations based on communication system and communications related to one or more Key Management Systems (KMSs).

In certain prior art communication system systems, ever-increasing quantities of data is stored online. Some data therein is critical, encrypted, secure, and/or private. For example, much of this data is private and some may be protected by confidentiality laws and regulations. Some of the data is encrypted to guard data from malicious insiders, external attackers, and/or accidental exposure requires. Encryption can operate using one or more encryption keys. Without appropriate encryption key(s), encrypted data cannot be deciphered. Therefore, reliable supply and management of keys is essential whenever dealing with encrypted data.

In addition, more recently, certain information is stored within one or more remote storage devices that are operated and maintained by another party. In certain prior art implementations, this other party service provider will have access to and be able to see the one or more encryption keys that is stores, manages, and provides to the clients and/or users that it services. In such situations, such a client and/or user can be totally susceptible and vulnerable to any bad intentions, behavior, lack of trust, etc. of such another party service provider.

Such prior art storage systems including those that store keys that are used to access secure and encrypted information (e.g., Key Management Systems (KMSs)) include many problems. In addition, within attempts to implement such storage systems based on cloud-based technology, the problems can become even more exacerbated. For example, cloud cloud-based implementation of such prior art storage systems creates additional security threats. Considering some examples, a tenant must trust the cloud provider and its operations. There must be trust that the cloud provider will manage the system correctly. This includes having faith that the cloud provider will be free of configuration errors, will effectively perform safeguard backups, will have correct policies and controls in place for tenant data, etc. Also, there must be confidence that the cloud provider will not have malicious insiders that may compromise sensitive data, will properly vet employees, will have auditing processes, and will not grant excessive unchecked power to system admins. Also, there must be assurance that the cloud provider will appropriately isolate tenants. This can include ensuring that the cloud provide will prevent side channel inter-virtual machine (VM) and inter-container attacks, protect memory, wipe drives between use, and prevent network sniffing. Also, there must be confidence that the cloud provider will guard against attacks including those that may originate from anywhere on Internet. There must be trust that the cloud provider will protect the network, (e.g., including the point of ingress for all cloud data), will monitor for breaches, will survive Distributed Denial of Service (DDOSs), will apply patches, and will use and validate certificates appropriately.

Existing and prior art storage systems that are implemented based on cloud-based technology require placing significant trust in a single cloud provider and/or maintaining one's own KMS infrastructure. Lack of security or confidence in adequate security are some of the major considerations that are preventing implementations of such prior art storage systems using on cloud-based technology. Such fears are existent when storing normal data (e.g., data that is not private, secret, and/or of high value), and those fears become amplified when dealing with secure data, encrypted data, encryption keys, etc. The prior art does not provide adequate solutions by which various concerns such as privacy, security, trust, etc. are adequately addressed while providing for confident and reliable user servicing for acceptable performance and user experience.

SUMMARY

Embodiments of the present invention disclose a computer-implemented method, a system, and a computer program product for effectuating one or more Key Management System (KMS) services based on one or more Oblivious Pseudorandom Functions (OPRFs). Within such an implementation, two parties (e.g., a computing device such as associated with a client and a KMS service) operate cooperatively to evaluate a function and ultimately to provide a key to the client. The first party supplies and input, and the second party supplies an OPRF key (e.g., an OPRF secret). Only the first party receives (or can learn) the output of the OPRF and cannot learn or see the OPRF key. The input value is unknown to the second party, and the OPRF key is unknown to the first party. Also, the second party cannot learn or see the input or the output of the OPRF. Also, the key provided by the second party is unknown to the second party.

In contradistinction, within prior art cloud-based technologies, the provider of a cloud-based KMS services operates such that the provider will see the tenant's keys. In the course of the computation as performed using the novel solutions herein, the first party does not learn any information about an OPRF secret (e.g., an OPRF key) that is used by the second party. In certain optional operations, the OPRF secret is based on a Customer Root Key (CRK). Such novel solutions as presented herein including to support a Key Management System (KMS) can be implemented using cloud-based technology while requiring zero trust in the cloud provider and without requiring any KMS infrastructure in tenant premises.

In accordance with such operation, an input value that is associated with a key is processed by the first party based on a blinding key in accordance with an Oblivious Pseudorandom Function (OPRF) blinding operation (e.g., homomorphic encryption, one or more other blinding operations, etc.) to generate a blinded value. Then, the blinded value is transmitted (e.g., via a communication system) to the second party (e.g., another computing device that is associated with a KMS service). A blinded key is generated based on processing of the blinded value based on an Oblivious Pseudorandom Function (OPRF) using an OPRF secret (e.g., by the second party). The blinded key is then received by the first party (e.g., via the communication system and from the second party that is associated with the KMS service). The blinded key is processed based on the blinding key in accordance with an Oblivious Pseudorandom Function (OPRF) unblinding operation (e.g., homomorphic decryption, one or more other unblinding operations, etc.) to generate the key that is associated with the input value. If desired within a particular implementation, secure information is accessed based on the key that is generated (e.g., via the communication system). In certain optional operations, the key may be of any desired type including a Data Encryption Key (DEK) or a Key Encryption Key (KEK).

The communications between the first party and second party are protected and are invulnerable to interception. Also, such communications between the first party and second party need not be implemented particularly using special secure communication protocols such as Transport Layer Security (TLS).

In accordance with other such optional operations, a key as generated herein may include a public or private key of a pair of asymmetric keys (e.g., a pair of asymmetric keys based on structured key parameters and that includes a first key and a second key, some examples including one key is a public key, and another key that is a private key in a public-private key pair of asymmetric keys). In such an implementation, the second party may determine structured key parameters and a deterministic function that specifies generation of the first key or the second key of the pair of asymmetric keys. Such structured key parameters and deterministic function is provided from the first party to the second party in some instances. Based on this information, the blinded key is processed by the first party to generate one of those keys within the pair of asymmetric keys that may then be used with the other of the keys in the pair of asymmetric keys to access such secure information that is based on the pair of asymmetric keys. Such an implementation provides for secure storage and retrieval of one of the keys of such a pair of asymmetric keys.

In addition, in accordance with other such optional operations, such operations may include processing of a private key of the public-private key pair of asymmetric keys based on a public key of the public-private key pair of asymmetric keys to verify correctness of the private key of the public-private key pair of asymmetric keys. This can be used to ensure the integrity of the keys that are stored within such a KMS service.

BRIEF DESCRIPTION OF THE DRAWINGS

FIG. 1A is a diagram illustrating an embodiment of one or more communication systems supporting a Key Management System (KMS) according to various embodiments of the present invention;

FIG. 1B is a diagram illustrating an embodiment of one or more communication systems according to various embodiments of the present invention;

FIG. 1C is a diagram illustrating an embodiment of a computing device configured to operate within one or more communication systems according to various embodiments of the present invention;

FIG. 1D is a diagram illustrating an embodiment of a wireless communication system according to various embodiments of the present invention;

DETAILED DESCRIPTION

Figure 2A:
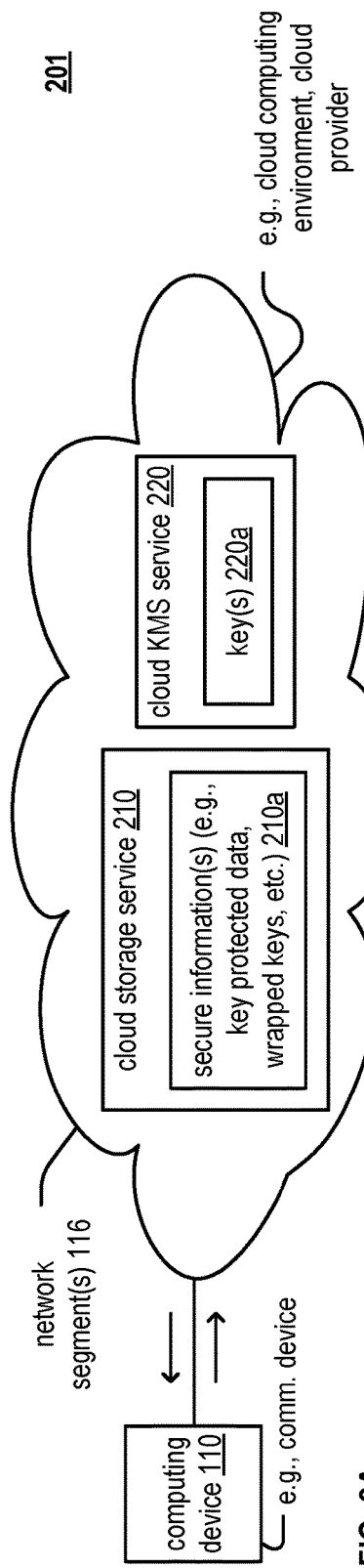
FIG. 2A is a diagram illustrating another embodiment of one or more communication systems supporting a KMS according to various embodiments of the present invention.

According to an embodiment of the present invention, novel key management and key security operates based on obliviousness to provide for security and secrecy of keys that are used such as based on one or more Key Management Systems (KMSs). This novel key management and key security also involves generation of one or more keys in accordance with an Oblivious Pseudorandom Function (OPRF) blinding operation (e.g., homomorphic encryption, one or more other blinding operations, etc.) and/or Oblivious Pseudorandom Function (OPRF) processing. In some examples, this includes performing an OPRF blinding operation (e.g., homomorphic encryption, one or more other blinding operations, etc.) (and an OPRF unblinding operation (e.g., homomorphic decryption, one or more other unblinding operations, etc.)) and supporting OPRF processing based on client (e.g., user) operations and service provider (e.g., KMS) operations. The various entities interact with one another in a manner that the two parties operate cooperatively to evaluate a function and ultimately to provide a key to the client. In accordance with such OPRF processing, the client cannot determine an OPRF secret used by the service provider, and the service provider cannot determine the input and/or output associated with the client. In addition, the service provider cannot see and cannot determine the one or more keys that it provides to one or more clients. Also, in one example of such novel solutions as presented herein, the keys are regenerated each time they are used. This can be used to offload a large amount of storage and also to offload processing load to a large number of clients. This provides for the possible implementation of a scaleable system that takes obviates the need for a centralized server or a Hardware Security Module (HSM) as is used in prior art systems.

FIG. 1A is a diagram illustrating an embodiment 101 of one or more communication systems supporting a Key Management System (KMS) according to various embodiments of the present invention. One or more computing devices (e.g., computing device 110, computing device 112, etc.) is configured to support communications via one or more other computing devices and/or one or more network segments 116. In one example, the computing device 110 is in communication with a computing device 112 via the one or more network segments 116. For example, the computing device 110 is associated with a first user, and the computing device 112 is associated with a second user. The one or more network segments 116 may be implemented in accordance with a cloud computing environment 50 such as described with reference to FIG. 11, and one or more network segments 116 may include one or more other computing devices therein (e.g., nodes, routers, gateways, servers, relays, transcoders, etc.) in some examples and/or embodiments.

The computing device 110 is configured to access secure information (e.g., secure, private, encrypted, etc. data, keys, etc.) based on one or more keys. Examples of such keys may be of various types including one or more of a Data Encryption Key (DEK), Key Encryption Key (KEK), Wrapped Data Encryption Key (WDEK), Master Key Encryption Key (M-KEK), Instance Key Encryption Key (I-KEK), Customer Root Key (CRK), and/or any other type of key including those associated with and used to encrypt and/or decrypt information, etc.

For example, once a key is generated, the computing device 110 may be configured to use that key to access secure information that is stored within the one or more network segments 116 and/or stored within a cloud-based technology that is based on or accessible via the one or more network segments 116. For example, the computing device 110 requests encrypted data that is stored by a cloud provider, receives that encrypted data that is stored by that cloud provider, and then uses the key to decrypt that encrypted data.

In general, in accordance with such security, encryption, etc., a key is used by the computing device 110 to access secure information (e.g., data, keys, etc.) that are kept unavailable to others that do not have the key. In general, a Key Management System (KMS) may be viewed as being a system for managing, reliably maintaining, and controlling access to keys on behalf computing devices, users, and/or applications, etc. High availability and durability is critical for a KMS. For example, considering a particular instance, if the KMS fails, any attempt to restore data encrypted with keys managed by the KMS will also fail. Security and proper access control enforcement and auditing is also essential. For example, if the wrong entity (e.g., an unauthorized entity) acquires a key from the KMS, the KMS has effectively disclosed to that party all data, keys, etc. encrypted under that key.

In an example of operation and implementation, a computing device 110 (e.g., such as associated with a user) is configured to support communications with a Key Management System (KMS) via one or more communication systems (e.g., the Internet, an intranet, a proprietary network, a private network, a public network, etc.) via the one or more network segments 116. The computing device 110 is configured to process an input value that is associated with a key based on a blinding key in accordance with an Oblivious Pseudorandom Function (OPRF) blinding operation (e.g., homomorphic encryption, one or more other blinding operations, etc.) to generate a blinded value. Such an input value may be any desired value (e.g., an arbitrary identifier, a file name, an object name, an object identifier (ID), etc. a hash of any such elements such as a hash of an arbitrary identifier, a file name, an object name, an ID, etc.).

The computing device 110 is also configured to transmit (e.g., via the one or more network segments 116) the blinded value to another computing device that is associated with a Key Management System (KMS) service (shown as KMS service 121). The computing device 110 is also configured to receive (e.g., via the one or more network segments 116 and from the KMS service 121) a blinded key. Note that the blinded key is based on processing of the blinded value based on an Oblivious Pseudorandom Function (OPRF) using an OPRF secret. In some examples, the KMS service 121 is configured to process the blinded value based on the OPRF using the OPRF secret. The computing device 110 is also configured to process the blinded key based on the blinding key in accordance with an OPRF unblinding operation (e.g., homomorphic decryption, one or more other unblinding operations, etc.) to generate the key that is associated with the input value. Then, the computing device 110 is also configured to access (e.g., via the one or more network segments 116) secure information based on the key. Examples of such secure information may include information that is private, secret, and/or of high value. Examples of such data that may include any one or more of personal information, health data, financial data, strategic plans, competitive information, trade secrets, bitcoin wallets, customer lists, and/or any other type of data that may be private, secret, and/or of high value.

In some examples, the input value is unknown to the KMS service 121 and includes a key identifier (key id) that is associated with the key. Also, the key is unknown to the KMS service 121 and may include any type of key including those mentioned above including a DEK or a KEK. In some specific examples, the OPRF secret is unknown to the computing device 110 and is based on a Customer Root Key (CRK) that is associated with the computing device 110.

FIG. 1B is a diagram illustrating an embodiment 102 of one or more communication systems according to various embodiments of the present invention. One or more network segments 116 provide communication inter-connectivity for at least two computing devices 110 and 112 (e.g., such computing devices may be implemented and operative to support communications with other computing devices in certain examples, and such computing devices may alternatively be referred to as communication devices in such situations including both computing device and communication device functionality and capability). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. In general, the one or more network segments 116 may be implemented to support a wireless communication system, a wire lined communication system, a non-public intranet system, a public internet system, a local area network (LAN), a wireless local area network (WLAN), a wide area network (WAN), a satellite communication system, a fiber-optic communication system, and/or a mobile communication system. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 110-114 may be of a variety of types of devices including stationary devices, mobile devices, portable devices, etc. and may support communications for any of a number of services or service flows including data, telephony, television, Internet, media, synchronization, etc.

In an example of operation and implementation, device 110 includes a communication interface to support communications with one or more of the other devices 112-114. In an example, the computing device 110 includes a communication interface configured to interface and communicate with a communication network (e.g., the one or more network segments 116), memory that stores operational instructions, and a processor coupled to the communication interface and to the memory. The processor is configured to execute the operational instructions to perform various functions, operations, etc. Note that the communication supported by the computing device 110 may be bidirectional/to and from the one or more of the other computing devices 112-114 or unidirectional (or primarily unidirectional) from the one or more of the other computing devices 112-114.

In one example, computing device 110 includes a processor that generates, modulates, encodes, etc. and transmits signals via a communication interface of the computing device 110 and also receives and processes, demodulates, decodes, etc. other signals received via the communication interface of the computing device 110 (e.g., received from other computing devices such as computing device 112, computing device 114, etc.).

Note also that the communication interface 120 may include functionality to support receipt of user input and output of user output (e.g., via a touchscreen, a keyboard, audio and/or video input/output ports, etc.) to facilitate interaction with one or more users of the computing device 110-1. Such functionality is implemented separately from the communication interface 120 in some examples and is integrated into the communication interface 120 in other examples.

In an example of operation, computing device 110 is configured to process an input value that is associated with a key based on a blinding key in accordance with an OPRF blinding operation (e.g., homomorphic encryption, one or more other blinding operations, etc.) to generate a blinded value. The computing device 110 is also configured to transmit, via the communication system such as via the one or more network segments 116, the blinded value to computing device 112 and/or computing device 114 that is associated with a Key Management System (KMS) service. The computing device 110 is also configured to receive, via the communication system such as via the one or more network segments 116 and from the computing device 112 and/or the computing device 114 that is associated with the KMS service, a blinded key. Note that the blinded key is based on processing of the blinded value based on an Oblivious Pseudorandom Function (OPRF) using an OPRF secret. In some examples, the computing device 112 and/or computing device 114 is configured to process the blinded value based on the OPRF using the OPRF secret. Then, the computing device 110 is configured to process the blinded key based on the blinding key in accordance with an OPRF unblinding operation (e.g., homomorphic decryption, one or more other unblinding operations, etc.) to generate the key that is associated with the input value. In some examples, the computing device 110 is configured to use the key to access secure information (e.g., via the communication system such as via the one or more network segments 116, based on locally available and/or stored secure information, and/or combination thereof, etc.). Such secure information may be data, keys, etc. and/or other information that is stored within one or more other computing devices that are accessible via the communication system such as via the one or more network segments 116.

FIG. 1C is a diagram illustrating an embodiment 103 of a computing device configured to operate within one or more communication systems according to various embodiments of the present invention. The computing device 110-1 includes a communication interface 120 and processing circuitry 130. The communication interface 120 includes functionality of a transmitter 122 and a receiver 124 to support communications with one or more other devices within a communication system. The computing device 110-1 may also include memory 140 to store information including one or more signals generated by the computing device 110-1 or such information received from other devices (e.g., computing device 112) via one or more communication channels. For example, memory 140 may also include and store various operational instructions for use by the processing circuitry 130 in regards to the processing of messages and/or other received signals and generation of other messages and/or other signals including those described herein (e.g., image and/or video signals). Memory 140 may also store information including one or more types of encoding, one or more types of symbol mapping, concatenation of various modulation coding schemes, etc. as may be generated by the computing device 110-1 or such information received from other devices via one or more communication channels. The communication interface 120 supports communications to and from one or more other devices (e.g., computing device 112-1 and/or other computing devices). Memory 140 may also store information including one or more types of video and/or image processing in accordance with the various aspects, embodiments, and/or examples, and their equivalents, described herein.

Operation of the communication interface 120 may be directed by the processing circuitry 130 such that processing circuitry 130 transmits and receives signals (TX(s) and RX(s)) via the communication interface 120. Generally speaking, computing device 110-1 is able to support communications with one or more other computing device within one or more communication systems including computing device 112-2.

A computing device 110-1 (e.g., which may be any one of computing devices 110, 112, or 114 as with reference to FIG. 1B) is in communication with another computing device 112-1 (and/or any number of other wireless computing devices) via a communication medium. The computing device 110-1 includes a communication interface 120 to perform transmitting and receiving of at least one signal, symbol, packet, and/or frame, etc. (e.g., using a transmitter 122 and a receiver 124) (note that general reference to packet or frame may be used interchangeably).

Generally speaking, the communication interface 120 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the computing device 110-1 operates), equalization, pre-equalization, metric generation, symbol mapping and/or de-mapping, automatic gain control (AGC) operations, and/or any other operations that may be performed by an AFE and/or PHY component within a computing device.

In some implementations, the computing device 110-1 also includes a processing circuitry 130, and an associated memory 140, to execute various operations including interpreting at least one signal, symbol, packet, and/or frame transmitted to computing device 112-1 and/or received from the computing device 112-1 and/or any other computing device. The computing devices 110-1 and 112-1 may be implemented using at least one integrated circuit in accordance with any desired configuration or combination of components, modules, etc. within at least one integrated circuit. Also, the computing devices 110 and/or 112 may each include one or more antennas for transmitting and/or receiving of at least one packet or frame wirelessly (e.g., computing device 110-1 may include m antennas, and computing device 112-1 may include n antennas, where m and n are positive integers).

Also, in some examples, note that one or more of the processing circuitry 130, the communication interface 120 (including the TX 122 and/or RX 124 thereof), and/or the memory 140 may be implemented in one or more "processing modules," "processing circuits," "processors," and/or "processing units" or their equivalents. Considering one example, a system-on-a-chip (SOC) 130a may be implemented to include the processing circuitry 130, the communication interface 120 (including the TX 122 and/or RX 124 thereof), and the memory 140 (e.g., SOC 130a being a multi-functional, multi-module integrated circuit that includes multiple components therein). Considering another example, processing-memory circuitry 130b may be implemented to include functionality similar to both the processing circuitry 130 and the memory 140 yet the communication interface 120 is a separate circuitry (e.g., processing-memory circuitry 130b is a single integrated circuit that performs functionality of a processing circuitry and a memory and is coupled to and also interacts with the communication interface 120).

Considering even another example, two or more processing circuitries may be implemented to include the processing circuitry 130, the communication interface 120 (including the TX 122 and/or RX 124 thereof), and the memory 140. In such examples, such a "processing circuitry," "processing circuitry," or "processing circuitries" (or "processor" or "processors") is/are configured to perform various operations, functions, communications, etc. as described herein. In general, the various elements, components, etc. shown within the computing device 110-1 may be implemented in any number of "processing modules," "processing circuits," "processors," and/or "processing units" (e.g., 1, 2, ..., and generally using N such "processing modules," "processing circuits," "processors," and/or "processing units", where N is a positive integer greater than or equal to 1).

In some examples, the computing device 110-1 includes both processing circuitry 130 and communication interface 120 configured to perform various operations. In other examples, the computing device 110-1 includes SOC 130a configured to perform various operations. In even other examples, the computing device 110-1 includes processing-memory circuitry 130b configured to perform various operations. Generally, such operations include generating, transmitting, etc. signals intended for one or more other computing device (e.g., computing device 112-1) and receiving, processing, etc. other signals received for one or more other devices (e.g., computing device 112-1).

In some examples, note that the communication interface 120, which is coupled to the processing circuitry 130, is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the computing device 110-1 may be communicated via any of these types of communication systems.

Note that computing device 110-1 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system, among other types of communication systems.

In an example of operation and implementation, a computing device includes a communication interface 120 configured to interface and communicate with a communication network, memory 140 that stores operational instructions, and processing circuitry 130 coupled to the communication interface and to the memory.

The processing circuitry 130 is configured to execute the operational instructions to perform various functions, operations, and processes (sometimes in cooperation with the communication interface 120 and/or the memory 140). In an example, the processing circuitry 130 is configured to process an input value that is associated with a key based on a blinding key in accordance with an OPRF blinding operation (e.g., homomorphic encryption, one or more other blinding operations, etc.) to generate a blinded value. The processing circuitry 130 is then configured to transmit, via the communication interface 120, the blinded value to another computing device 112-1 that is associated with a Key Management System (KMS) service. The processing circuitry 130 is configured to receive, via the communication interface 120 and from the computing device 112-1 that is associated with the KMS service, a blinded key. Note that the blinded key is based on processing of the blinded value based on an OPRF using an OPRF secret. In some examples, the computing device 112-1 is configured to process of the blinded value based on an OPRF using an OPRF secret. The processing circuitry 130 is then configured to process the blinded key based on the blinding key in accordance with an OPRF unblinding operation (e.g., homomorphic decryption, one or more other unblinding operations, etc.) to generate the key that is associated with the input value. In some examples, the computing device 110-1 is configured to access secure information based on the key (e.g., via the communication system, based on locally available and/or stored secure information, and/or combination thereof, etc.).

FIG. 1D is a diagram illustrating an embodiment 100 of a wireless communication system according to various embodiments of the present invention. The wireless communication system includes one or more base stations and/or access points 150, wireless communication devices 160-166 (e.g., wireless stations (STAs)), and a network hardware component 156. The wireless communication devices 160-166 may be laptop computers, or tablets, 160, personal digital assistants 162, personal computers 164 and/or cellular telephones 166 (and/or any other type of wireless communication device). Other examples of such wireless communication devices 160-166 could also or alternatively include other types of devices that include wireless communication capability (and/or other types of communication functionality such as wired communication functionality, satellite communication functionality, fiber-optic communication functionality, etc.). Examples of wireless communication devices may include a wireless smart phone, a cellular phone, a laptop, a personal digital assistant, a tablet, a personal computers (PC), a work station, and/or a video game device.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The one or more base stations (BSs) or access points (APs) 150 are operably coupled to the network hardware 156 via local area network connection 152. The network hardware 156, which may be a router, switch, bridge, modem, system controller, etc., provides a wide area network connection 154 for the communication system. Each of the one or more base stations or access points 150 has an associated antenna or antenna array to communicate with the wireless communication devices in its area. Typically, the wireless communication devices register with a particular base station or access point 150 to receive services from the communication system. For direct connections (i.e., point-to-point communications), wireless communication devices communicate directly via an allocated channel.

Any of the various wireless communication devices (WDEVs) 160-166 and one or more BSs or APs 150 may include a processing circuitry and/or a communication interface to support communications with any other of the wireless communication devices 160-166 and one or more BSs or APs 150. In an example of operation, a processing circuitry and/or a communication interface implemented within one of the devices (e.g., any one of the WDEVs 160-166 and one or more BSs or APs 150) is/are configured to process at least one signal received from and/or to generate at least one signal to be transmitted to another one of the devices (e.g., any other one of the one or more WDEVs 160-166 and one or more BSs or APs 150).

Note that general reference to a communication device, such as a wireless communication device (e.g., WDEVs) 160-166 and one or more BSs or APs 150 in FIG. 1D, or any other communication devices and/or wireless communication devices may alternatively be made generally herein using the term 'device' (e.g., "device" when referring to "wireless communication device" or "WDEV"). Generally, such general references or designations of devices may be used interchangeably.

The processing circuitry and/or the communication interface of any one of the various devices, WDEVs 160-166 and one or more BSs or APs 150, may be configured to support communications with any other of the various devices, WDEVs 160-166 and one or more BSs or APs 150. Such communications may be uni-directional or bi-directional between devices. Also, such communications may be uni-directional between devices at one time and bi-directional between those devices at another time.

In an example, a device (e.g., any one of the WDEVs 160-166 and one or more BSs or APs 150) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 160-166 and one or more BSs or APs 150) includes a processing circuitry to support communications with one or more of the other wireless communication devices (e.g., any other of the WDEVs 160-166 and one or more BSs or APs 150). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 160-166 and one or more BSs or APs 150) includes a processing circuitry, a communication interface, and a memory configured to support communications with one or more of the other wireless communication devices (e.g., any other of the WDEVs 160-166 and one or more BSs or APs 150).

In an example of operation and implementation, WDEV 160 is configured to process an input value that is associated with a key based on a blinding key in accordance with an OPRF blinding operation (e.g., homomorphic encryption, one or more other blinding operations, etc.) to generate a blinded value. The WDEV 160 is then configured to transmit the blinded value to another computing device (e.g., WDEV 164 and/or some other computing device via network hardware 156) that is associated with a Key Management System (KMS) service. The WDEV 160 is configured to receive, from that other computing device that is associated with the KMS service, a blinded key. Note that the blinded key is based on processing of the blinded value based on an OPRF using an OPRF secret. In some examples, this computing device is configured to process of the blinded value based on an OPRF using an OPRF secret. The WDEV 160 is then configured to process the blinded key based on the blinding key in accordance with an OPRF unblinding operation (e.g., homomorphic decryption, one or more other unblinding operations, etc.) to generate the key that is associated with the input value. In some examples, the WDEV 160 is configured to access secure information based on the key (e.g., via the communication system, based on locally available and/or stored secure information, and/or combination thereof, etc.).

In accordance with a Key Management System (KMS), and particularly in accordance with a KMS that operates based on a cloud-based system, there can be situations in which there is fear, uncertainty, lack of confidence, and/or lack of trust, etc. when storing normal data in the cloud are amplified and particularly when it comes to storage of the encryption keys that are used to access that data. For example, some data that may be encrypted may include any one or more of personal information, health data, financial data, strategic plans, competitive information, trade secrets, bitcoin wallets, customer lists, and/or other types of data. Such data is encrypted when it is private, secret, or of high-value. as such, the security of encrypted data is directly related to and dependent on, at least in part, on the security of the keys used to access that data.

FIG. 2A is a diagram illustrating another embodiment 201 of one or more communication systems supporting a KMS according to various embodiments of the present invention. This diagram shows a computing device 110 that is configured to interact with a cloud storage service 210 and a cloud Key Management System (KMS) service 220 that are both implemented within the same environment (e.g., one or more network segments 116 that may be implemented as a cloud computing environment, a cloud provider, etc.). The cloud storage service 210 may include various types of one or more secure information 210a (e.g., key protected data, wrapped key, etc. and/or other secure information). The cloud KMS service 220 may include one or more keys 220a that may be used by one of more users associated with one or more computing devices to access the various types of one or more secure information 210a.

In this implementation, when the same cloud provider is used for both the cloud storage service 210 and the cloud KMS service 220, a malicious insider or corrupt cloud provider could access tenant data. As such, trust requirements are maximized in order to ensure the security of the data. For example, a customer using the same provider for both services (e.g., the cloud storage service 210 and the cloud KMS service 220) requires that they have complete confidence in that provider and its processes.

Figure 2B:
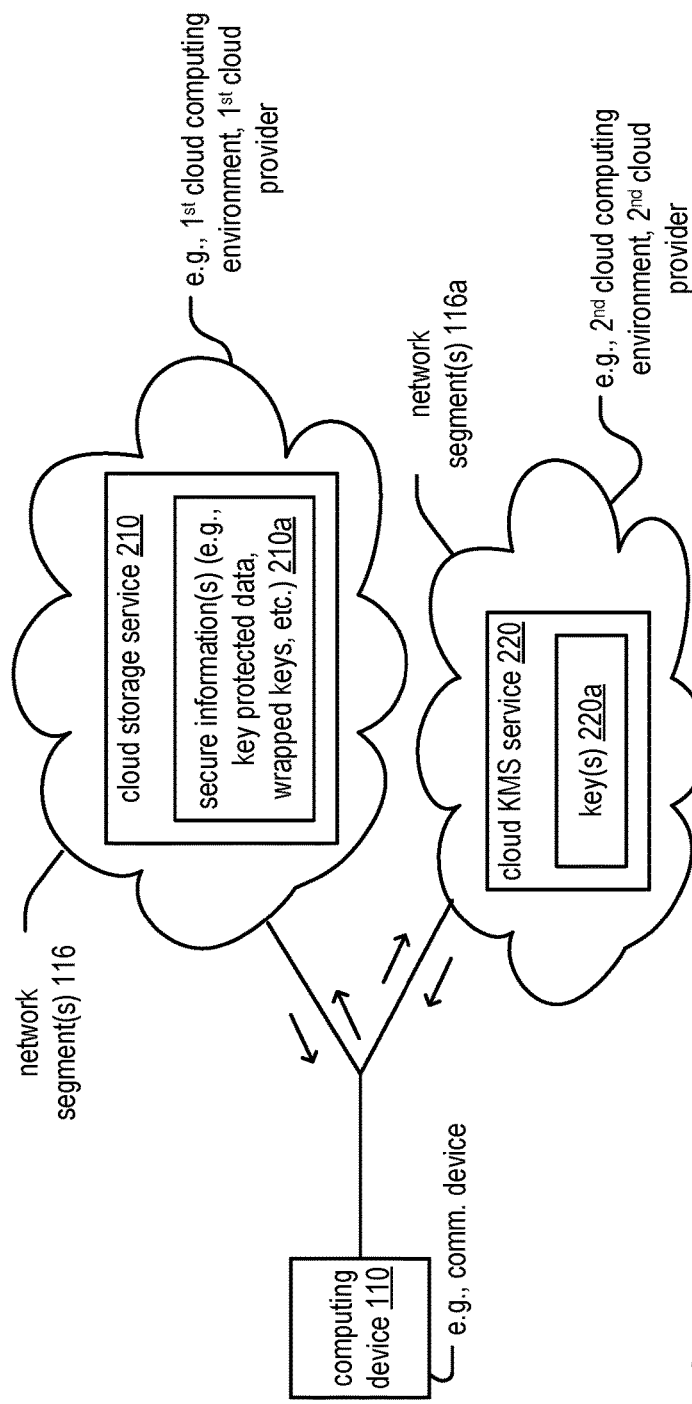
FIG. 2B is a diagram illustrating another embodiment of one or more communication systems supporting a KMS according to various embodiments of the present invention.

FIG. 2B is a diagram illustrating another embodiment 202 of one or more communication systems supporting a KMS according to various embodiments of the present invention. This diagram shows a computing device 110 that is configured to interact with a cloud storage service 210 and a cloud KMS service 220 that are separately implemented within different environments (e.g., the cloud storage service 210 implemented based on one or more network segments 116 that may be implemented as a first cloud computing environment, a cloud provider, etc., and the KMS service 220 based on one or more network segments 116a that may be implemented as a second cloud computing environment, a cloud provider, etc.). Similarly as described above, the cloud storage service 210 may include various types of one or more secure information 210a (e.g., key protected data, wrapped key, etc. and/or other secure information), and the cloud KMS service 220 may include one or more keys 220a that may be used by one of more users associated with one or more computing devices to access the various types of one or more secure information 210a.

In this implementation, when two separate and distinct cloud providers are used for the cloud storage service 210 and a cloud KMS service 220, respectively, there can be higher complexity of the overall system, and there can be a likelihood of incompatible Application Program Interfaces (APIs). As such certain interoperability issues and other problems may emerge. For example, note that while customer doesn't necessarily need to have complete trust in any one specific provider, this implementation can unfortunately introduce a number of interoperability issues. For example, APIs and libraries for interfacing between the two services may not be compatible. Also, functions such as "Server Side Encryption" (SSE) may not work at all in such an implementation.

Figure 3A:
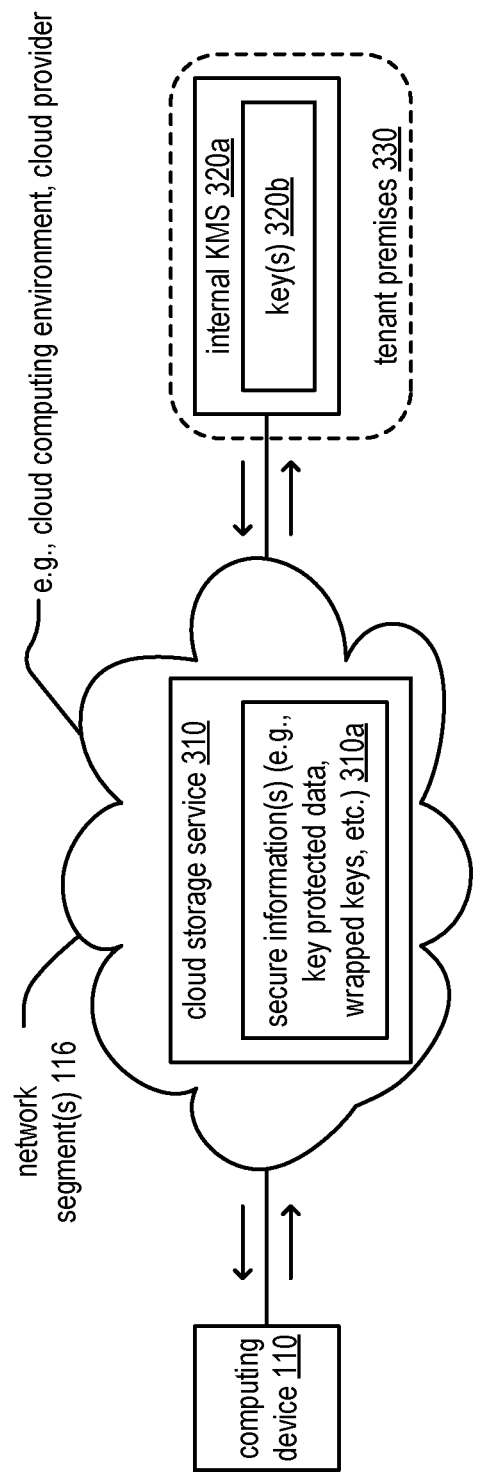
FIG. 3A is a diagram illustrating another embodiment of one or more communication systems supporting a KMS according to various embodiments of the present invention.

FIG. 3A is a diagram illustrating another embodiment 301 of one or more communication systems supporting a KMS according to various embodiments of the present invention. This diagram shows a computing device 110 that is configured to interact with a cloud storage service 310 and an internal KMS service 320a that may be implemented at a tenant premises 330. For example, the tenant premises 330 may be located remotely from the computing device 110 and is accessible via one or more network segments 116 that may be implemented as a cloud computing environment, a cloud provider, etc. Similarly as described above with respect to other embodiments and examples, the cloud storage service 310 may include various types of one or more secure information 310a (e.g., key protected data, wrapped key, etc. and/or other secure information), and the internal KMS service 320 may include one or more keys 320b that may be used by one of more users associated with one or more computing devices to access the various types of one or more secure information 310a.

In this implementation, when a tenant uses cloud storage (e.g., cloud storage service 310) to operate with an internal KMS service 320, the customer needs not necessarily have complete trust with the cloud provider, but such an implementation can require significant processes, expertise and expense to manage one's own KMS. Such an implementation can be very expensive.

For example, this diagram shows an implementation of a user of the cloud that may have little to no trust in the cloud provider to protect the security of its one or more keys. For example, such a user may trust a cloud storage provider to store encrypted data, yet that user trusts no cloud provider with holding of its one or more keys. In this implementation, while the user doesn't necessarily have to trust the cloud provider, the implementation can be problematic for various reasons including being very expensive, requiring a rare expertise, special-purpose equipment, requiring disaster recovery plan(s), trusted staff, and rigorous policies. Without these, it is very likely to be less reliable or less secure in practice than a cloud KMS.

Many such implementations of KMSs based on cloud-based technologies suffer for various reasons including requiring placing significant trust in a single provider and/or requiring the maintenance of one's own KMS infrastructure. This disclosure addresses such deficiencies and problems in the prior art including to provide a KMS that does not require any trust in the cloud provider and also needs no KMS infrastructure in the tenant premises. Such novel solutions as presented herein minimizes any required trust in a KMS service provider. For example, the one or more keys never leave customer premises, and the KMS service provider never sees those one or more keys. Also, no one can access the one or more keys without authenticating to the KMS provider. In addition, such novel solutions as presented herein provides for post-quantum security, in that, even with the advent of quantum capability of performing near limitless computation operations, the novel implementation as presented herein is immune to such advances in computing technology as may be targeted for hacking, invasive processes, etc. For example, a novel key access protocol approach as presented herein is immune from attackers with unlimited computational resources, including those with quantum computers.

Also, within such novel solutions as presented herein, the security of the keys if not dependent on the security of one or more communication channels over which communications are made. For example, some prior art approaches operate based on Transport Layer Security (TLS) and/or other means by to effectuate secure communications.

In addition, such novel solutions as presented herein provides for everlasting security, in that, the one or more keys remain secure. For example, even in the unfortunate event in which a KMS service provider is completely breached, the one or more keys remain totally secure. Note that some implementations may be implemented as requiring unpredictable key identifiers (ids) (e.g., using a "key id as a second factor"). Such novel solutions as presented herein obviates the requirement to have full and complete trust in a KMS service provider in terms of using or exposing the one of more keys the user wants the KMS service provider to store. The user may still seek a KMS service provider that does provide a highly available/reliable system, but the trust in that same KMS service provider to trust fully the KMS service provider in terms of using or exposing the one of more keys is obviated.

In an implementation when the tenant of a cloud KMS service provider trusts the provider with his keys, the tenant may operate by either storing them for later retrieval or in unwrapping them. In both cases, the cloud KMS service provider will sees the tenant's keys. Such novel solutions as presented herein provides for a means by which the cloud KMS service provider will never see the tenant's keys.

Figure 3B:
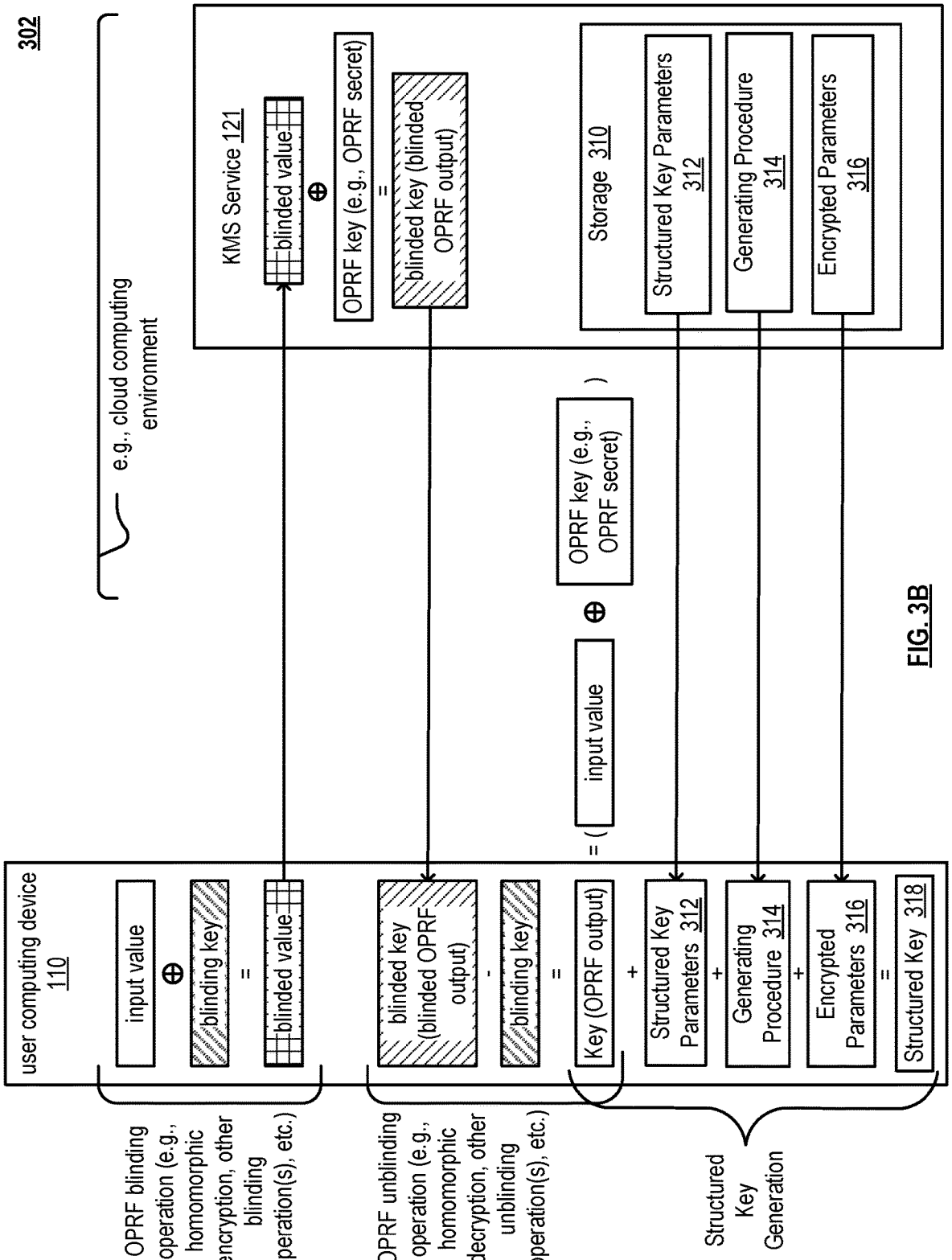
FIG. 3B is a diagram illustrating an embodiment of one or more communication systems supporting recovery of asymmetric/structured keys using an Oblivious Pseudorandom Function (OPRF) according to various embodiments of the present invention.

FIG. 3B is a diagram illustrating an embodiment of one or more communication systems supporting recovery of asymmetric/structured keys using an Oblivious Pseudorandom Function (OPRF) according to various embodiments of the present invention. An OPRF enables the tenant to get keys from the Cloud KMS provider. The property of obliviousness ensures the provider is cryptographically, mathematically, and provably not able to see or determine the keys. With respect to this diagram note that the "+" and "−" operations depicted therein are not arithmetical addition and subtraction per se. These operations may be exponentiation modulo a prime, or multiplication over an elliptic curve, or some other operations.

Considering an OPRF, an OPRF allows two parties to evaluate a function, Y, as follows:

Y=OPRF(K, X)

The OPRF secret K is only known to "Bob"; Alice can't determine it.

Output Y and input X are only known to "Alice"; Bob can't determine either.

An Oblivious PRF enables an ideal Cloud KMS:

The tenant uses "X" as a "key id" and "Y" as the key (DEK or KEK)

The OPRF guarantees the provider learns nothing about the key

The provider holds the OPRF secret: "K", functioning as a "CRK"

The OPRF can be viewed as a key derivation that occurs on a blinded value (e.g., on a homomorphically encrypted cipher text). Note that certain examples herein are described with respect to an OPRF blinding operation that is performed using homomorphic encryption (and a an OPRF unblinding operation that is performed using homomorphic decryption), in general, any OPRF blinding/OPRF unblinding operation may be used such that the process that performs the OPRF blinding/OPRF unblinding operation are known to client (e.g., user, computing device 110 such as "Alice," and not to "Bob"). One example of such OPRF blinding/OPRF unblinding operation includes homomorphic encryption/homomorphic decryption. However, in general, any function may be used to perform the OPRF blinding/OPRF unblinding operation to generate a blinded value that is unknown to the other computing device that is associated with the KMS service (e.g., server/KMS service 121 ("Bob")). For example, any desired function or mapping of an input value to generate an unknown input value (unknown to the other computing device that is associated with the KMS service such as server/KMS service 121 ("Bob")). Then, the client (e.g., user, computing device 110) knows how to perform the appropriate OPRF unblinding based on the OPRF blinding that was performed in that instance.

With respect to such an OPRF blinding operation that is performed using homomorphic encryption, the client (e.g., user, computing device 110) applies a homomorphic one-time-pad encryption key to an input value. For example, the client starts with some input value from which it wants to derive a key. For example, this input value could be a key id. The client then encrypts the input value with a one-time-pad encryption key (e.g., homomorphic one-time-pad encryption). The one-time-pad encryption key is randomly generated for this key recovery only and is or may be thrown away afterwards (e.g., not saved for future use).

This is an OPRF blinding operation that is performed using homomorphic encryption, and a one-time-pad. Accordingly, the encrypted (or blinded) result reveals zero information about the input. This cipher text (blinded value) is then sent to the server/KMS service 121. The server/KMS service 121 uses the OPRF key (e.g., a Customer Root Key (CRK) in some examples, an OPRF secret) to perform a key derivation function on this cipher text and returns it to the user. This is referred to herein as a blinded OPRF output.

Because of the homomorphic properties of the encryption, when the client (e.g., user, computing device 110) decrypts the result from the server/KMS service 121, it finds it gets the same value as had the server performed its key derivation function directly against the plaintext value. This result is considered the key, sometimes referred to as the OPRF output. The resulting key is equal to the key derivation function (KDF) (e.g., a deterministic function used to generate the key) applied to the input.

Note that even if the client had chosen a different random blinding key, the resulting key that would be generated would be the same. In fact, all possible blinded values are possible with any possible input value. This is why the server, and any eavesdroppers, gain no information about the input value or the derived key, from seeing what goes over the wire, network segment(s), cloud, etc. to the server/KMS service 121.

Note that this from of homomorphic encryption is a special-case form that is extremely efficient and practical. Note also that Hardware Security Modules (HSMs) are quoted as capable of performing 10s of thousands of such operations per second. CPUs can perform upwards of hundreds of thousands per second.

Also, note that the Key (OPRF output) is derived from the "Input Value" combined with the "OPRF Key" (e.g., an OPRF secret). Note also that the holder of the OPRF Key, the server/KMS service 121, never sees the Input Value, nor the Resulting key. This is enforced by a process of "Blinding" where both the input and the output are blinded in an information theoretically (quantum secure) way, such that the input and output yields zero information about the Key, neither to the KMS service, hackers, or the NSA. The following steps may be viewed as effectuating this process and exchange between a client (e.g., user, computing device 110) and server/KMS service 121:

1. Tenant generates random key: R
2. Tenant encrypts the "key id" using the random key: $E_R\{key\text{-}id\}$
3. Tenant sends encrypted result to the Cloud KMS provider
4. Cloud KMS provider encrypts result with its own key: P
5. Cloud KMS provider returns the result to the tenant: $E_P\{E_R\{key\text{-}id\}\}$
6. Tenant decrypts it with his random key R to get: $E_P\{key\text{-}id\}$ In some examples, a computing device 110 (e.g., a client such as associated with a user) is configured to process an input value that is associated with a key based on a blinding key in accordance with homomorphic encryption to generate a blinded value. The computing device is configured to transmit, via a communication system, the blinded value to another computing device (server/KMS service 121) that is associated with a Key Management System (KMS) service. The computing device is configured to receive, via the communication system and from the other computing device (server/KMS service 121) that is associated with the KMS service, a blinded key. The blinded key is based on processing of the blinded value based on an OPRF using an OPRF secret. For example, the server/KMS service 121 is configured to on processing of the blinded value based on the OPRF using the OPRF secret. The computing device 110 is then configured to process the blinded key based on the blinding key in accordance with homomorphic decryption to generate the key that is associated with the input value. In some examples, the computing device 110 is also configured to access, via the communication system, secure information based on the key.

When a structured key is requested, the key (OPRF output) recovered by unblinding the blinded key (blinded OPRF output), may require further processing before it meets the requirements for a particular type of structured key. In at least one embodiment, for example, the structured key 318 is generated from the blinded key (blinded OPRF output) using structured key parameters 312, generating procedure 314, and optionally encrypted parameters 316, as discussed in more detail below. Each of these items can be stored in storage 310 by KMS service 121, and provided to user computing device 110 along with the blinded key (blinded OPRF output). For example, the generating procedure can include a deterministic algorithm that accepts the unblinded key (the output of the OPRF), the structured key parameters, and optionally encrypted parameters as input to generate the structured key.

The structured key parameters can include one or more of: the key type and algorithm (RSA, DH, ElGamal, Elliptic Curve, etc.), key size (256-bits, 512-bits, 1024-bits, 2048-bits, etc.), modulus, generator, curve parameters. The encrypted parameters may contain secret information or parameters encrypted under a key, which can be produced from the OPRF output.

The generating procedure may include expanding the OPRF output (e.g. unblinded key) to a specific length (e.g., using a mask generating function) and then taking the result modulo a prime modulus specific to the Diffie-Hellman or Elliptic Curve parameters. In other embodiments the generating procedure can use the OPRF output (e.g. unblinded key) to seed a pseudorandom number generator (PRNG), using the PRNG to generate two large prime numbers, and using these two large prime numbers to produce an RSA modulus and then from the RSA modulus and the large prime numbers produce an RSA key pair.

In yet other embodiments, the generating procedure can use encrypted parameters, which can include two large primes from which an RSA key can be derived. In some such cases, the generating procedure can specify how to derive a symmetric encryption key from the OPRF output (unblinded key), use the derived symmetric encryption key to decrypt the encrypted parameters, and from these decrypted parameters, produce the structured key 318.

In an example of operation and implementation, once the key is generated (structured or otherwise), the computing device 110 uses that key to access secure information that is stored within a cloud-based technology that is based on or accessible via the one or more network segments. For example, the computing device 110 requests encrypted data that is stored by a cloud provider, receives that encrypted data that is stored by that cloud provider, and then uses the key to decrypt that encrypted data.

Further understanding of an Oblivious Pseudorandom Function (OPRF) may be made based on consideration of a Pseudorandom Function (PRF) (e.g., that is not oblivious). A Pseudorandom Function (PRF) is a function that takes two inputs:

1. a PRF key "K"; and
2. an arbitrary message "M".

From these two inputs, the PRF returns a "pseudorandom" output. This is an output that is statistically indistinguishable from random output. Also, the output is infeasible to be predicted without knowledge of K. These two properties make PRFs well-suited for key derivation, that is, creating sub-keys from some top-level "root" key. For example, an unlimited number of sub-keys may be computed from a PRF as follows:

sub-key_1=PRF(K, "1"), sub-key_2=PRF(K, "2"), sub-key_3=PRF(K, "3"), . . . , sub-key_n=PRF(K, "n")

This can simplify key management, as only a single top-level, or root key needs to be persisted while supporting a virtually unlimited number of derived keys.

In a Key Management System (KMS), users of the KMS may interact with the KMS to obtain encryption keys. An example of operation between a KMS requester (e.g., a computing device, a user such as associated with a computing device, etc.) and a KMS unit (e.g., another computing device, a KMS service, etc.) is as follows:

1. The requester seeking to access a key sends a Key Access Request (KAR) to a KMS unit, the request can include any one or more of:
  a. a requester identifier;
  b. a root key identifier;
  c. a sub-key identifier;
  d. authenticating information (e.g., credentials such as a password, a token, a response to a challenge, a signature, a digital certificate, etc.); and/or
  e. a challenge to the KMS unit (e.g., for the KMS unit to prove its identity or correctness of operation to the requester).

2. The KMS unit performs validation of the request, including any one or more of:
  a. Ensuring the credentials are correct for the requester identifier; and/or
  b. Ensuring the requester is authorized to access a key derived from the given root key identifier.

3. If not authorized, the KMS unit returns an error response and may create an audit log of the failure or take other corrective actions. If the request is authorized, the KMS unit proceeds to the next step.

4. The KMS unit processes the access request, by using the appropriate root key (either the one indicated in the request, or by inferring it from other information, such as the requester identifier) together with the sub-key identifier to compute a sub-key. For example, when using a PRF to derive a sub-key, the KMS unit may compute that subkey S, as S=PRF (root-key, sub-key identifier). The KMS unit may create an audit log of the successful access request. It then proceeds to the next step.

5. If a challenge was provided by the requester to the KMS unit, the KMS unit generates a response to the challenge (e.g., a question, and a response to that question that compares favorably with the question)

6. The KMS unit returns a response to the requester including the sub-key and a challenge if one was generated 7. The requester validates the response to the challenge (if provided), and if it is valid, proceeds to use the sub-key (e.g., to perform encryption or decryption operations).

One downside to using a PRF in this way is that the KMS unit learns all the sub-keys returned to requesters, as the KMS unit computes the PRF and sees the input and output of the function. This makes the KMS service a central point of compromise for all the keys used by all the requesters in the system.

Such novel solutions as presented herein provide for applying a function known as an Oblivious Pseudorandom Function (OPRF). This can be enable secure access of keys by requesters from the KMS without the KMS being able to observe the keys and/or sub-keys that are requested and returned.

An OPRF works as follows. It takes two inputs:
1. an OPRF key "K" (e.g., an OPRF secret)
2. an arbitrary message "M" (e.g., a key ID, a label, a user-provided identifier, etc.)

From these two inputs, the OPRF also returns a pseudo-random output. However, unlike the PRF, the OPRF is computed by two parties (e.g., the requester and the KMS). The first party supplies the input "M", while the second party supplies the OPRF key "K". Only the first party receives (or can learn) the output of the OPRF. In the course of the computation, the first party does not learn any information about "K". There are multiple implementations of OPRFs, including ones based on asymmetric encryption algorithms, RSA, blind signatures, Diffie-Hellman exponentiation, Elliptic Curve scalar multiplication, homomorphic encryption, and others. The general principle upon which OPRFs operate is that the first party obscures or "blinds" the input message "M" into a form which is meaningless to the second party before sending that second party. The second party then operates upon the input with a certain function that takes both the blinded input "B" along with the OPRF key "K" to produce a "blinded output" which is not the final output, but which is sent from the second party to the first party. The first party, with knowledge of how the original input was obscured, can then determine how to undo the impact of that operation from the blinded output, and recover the OPRF output. Because the reversal of the blinding is done by the first party, the second party never learns the OPRF output.

Taking the properties of the OPRF, and the design of the KMS described above together, the two may be merged to form a KMS which has superior security properties when compared to that which is provided in the prior art. This is done by substituting the PRF with an OPRF, and by having the requester perform some additional pre-processing of the request and some post-processing of the response. The workflow with for an interaction with a KMS based on an OPRF might be as follows:

1. The requester obscures one of the inputs to a key derivation function, for example, a sub-key identifier, by using an appropriate blinding function for the OPRF that is used by the KMS unit. This produces a blinded-input "B". In some examples, the size of the blinding key is same as the size of the input provided thereto. For example, if the input is X bits or bytes in length, then the blinding key X bits or bytes in length (where X is a positive integer).

2. The requester seeking to access a key sends an Oblivious Key Access Request (OKAR) to a KMS unit, the request can include any one or more of:
  a. a requester identifier;
  b. a root key identifier (e.g., additional information to reference a specific OPRF key, e.g., a specific OPRF secret);
  c. a blinded input B (e.g., B=BlindingFunction(sub-key identifier));
  d. authenticating information (e.g., credentials such as a password, a token, a response to a challenge, a signature, a digital certificate, etc.); and/or
  e. A challenge to the KMS unit (for the KMS unit to prove its identity or correctness of operation)

3. The KMS unit performs validation of the request, including any one or more of:
  a. Ensuring the credentials are correct for the requester identifier; and/or
  b. Ensuring the requester is authorized to access a key derived from the given root key identifier.

4. If not authorized, the KMS unit may be configured to return an error response and may create an audit log of the failure or take other corrective actions. If the request is authorized, the KMS unit proceeds to the next step.

5. The KMS unit processes the access request, by using the appropriate root key (either the one indicated in the request, or by inferring it from other information, such as the requester identifier) together with the blinded input to compute a blinded sub-key. For example, when using an OPRF to derive a blinded sub-key, the KMS unit may compute that blinded subkey S, as S=OPRF(root-key, B). The KMS unit may create an audit log of the successful access request. It then proceeds to the next step.

6. If a challenge was provided by the requester to the KMS unit, the KMS unit generates a response to the challenge.

7. The KMS unit returns a response to the requester including the blinded sub-key and a challenge if one was generated.

8. The requester validates the response to the challenge (if provided), and if it is valid, proceeds to unblind the sub-key using the appropriate function to unobscure the blinded sub-key and recover the OPRF output.

9. The requester uses the OPRF output as the key or to derive a key and then may perform encryption or decryption operations with that key.

In this manner, the KMS unit no longer sees the keys, and if the KMS unit cannot determine, predict, or guess the original unblinded sub-key identifiers, it has no capacity to determine any of the keys the requester receives.

Figure 4A:
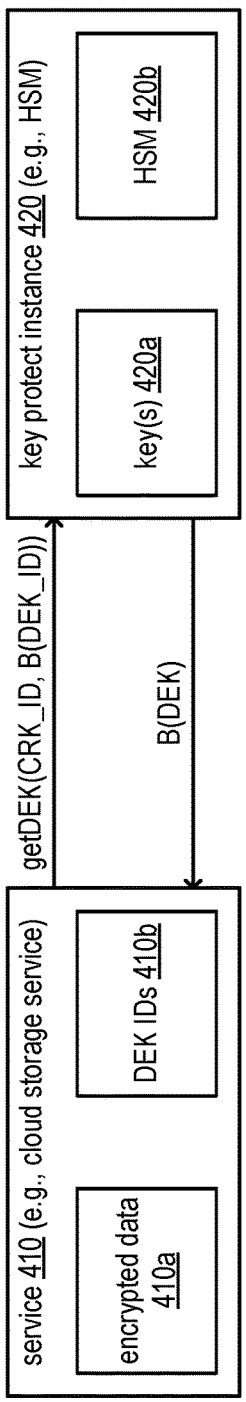
FIG. 4A is a diagram illustrating an embodiment of one or more communication systems supporting key protect with obliviousness according to various embodiments of the present invention.

FIG. 4A is a diagram illustrating an embodiment 401 of one or more communication systems supporting key protect with obliviousness according to various embodiments of the present invention. A service 410 (e.g., a cloud storage service, such as one that stores encrypted data 410a and Data Encryption Key (DEK) identifiers (IDs) 410b) and a key protect instance 410 (e.g., a Hardware Security Module (HSM) 420b, such as one that stores one or more keys 420a). The service 410 blinds a DEK ID to generate B(DEK_ID). Then, the service 410 transmits get DEK request (getDEK (CDK_ID, B(DEK_ID))) to the key protect instance 410. The key protect instance 410 processes the get DEK request (getDEK(CDK_ID, B(DEK_ID))) and returned a blinded key B(DEK).

In this implementation, there is no information about a Data Encryption Key (DEK) that is exposed by the exchange between the service 410 (e.g., a cloud storage service) and the key protect instance 410 (e.g., a Hardware Security Module (HSM)). This oblivious implemented architecture's security, unlike prior art approaches in which various components and signals are vulnerable to interception during transmission, remains secure against adversaries with unbounded computing power as no useful information is revealed through the exchange. There is no information that is vulnerable to be intercepted during this process.

With the post-quantum security of obliviousness, the exchanged messages reveal no information to the attacker. Note that even when implemented, a Transport Layer Security's (TLS's) confidentiality is made superfluous given the security provided by the novel implementation as described herein. A breached oblivious key protect instance 420 would not endanger data keys, assuming the key ids are unknown to the attacker. Data Keys (Data Encryption Keys (DEKs)) only exist and available within the boundary of the service or user recovering the key. The only change on the service side is that instead of storing wrapped DEKs, the system would simply store the DEK IDs.

Figure 4B:
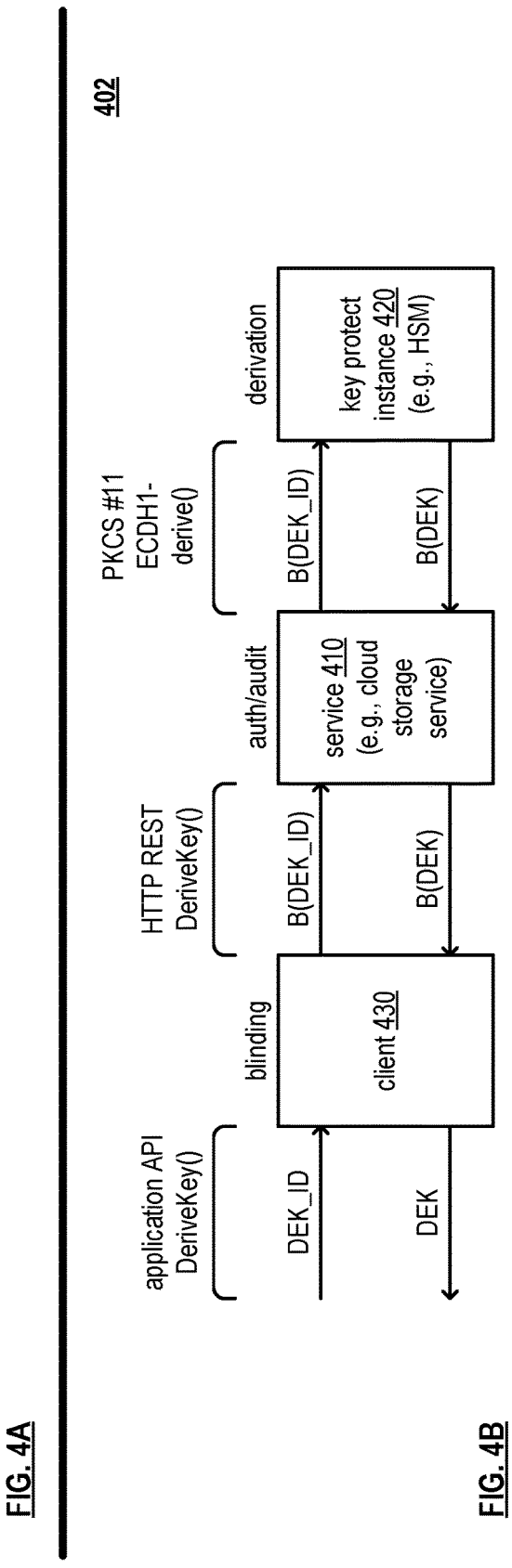
FIG. 4B is a diagram illustrating an embodiment of one or more communication systems supporting Hardware Security Module (HSM) integration according to various embodiments of the present invention.

FIG. 4B is a diagram illustrating an embodiment 402 of one or more communication systems supporting Hardware Security Module (HSM) integration according to various embodiments of the present invention. An already-implemented HSM that supports the math used in accordance with OPRFs may be readily configured to support the novel implementation as presented herein. For example, such math that is based on an Elliptic Curve operation (e.g., EC Diffie-Hellman) may be used to support such OPRFs as described herein.

For example, when the math of OPRFs is fully supported by an existing HSMs, then Customer Root Keys (CRKs) can remain within HSMs at all times and will never be exposed to the host's memory.

Referring to the diagram, an application API DeriveKey operate is supported by client 430 based on a Data Encryption Key (DEK) identifier (ID) (DEK_ID) that undergoes blinding to generate a blinded data encryption key identifier, B(DEK) that is processed via the service 410 (e.g., cloud storage service) based on service-side HTTP REST API via the key protect instance 420 (e.g., HSM) as follows:

Blinded(DEK) or B(DEK)=DeriveKey(CRK_ID, Blinded(DEK_ID))

This method takes two inputs, the customer root key identifier, CRK_ID, and the blinded data encryption key identifier, Blinded(DEK_ID)). It returns a blinded data encryption key, Blinded(DEK) or B(DEK).

With respect to the Client-side SDK API, the Data Encryption Key (DEK) is returned as follows:

DEK=DeriveKey(CRK_ID, DEK_ID)

This method takes the CRK id and the DEK id. The software development kit (SDK) code handles all blinding and de-blinding internally. It returns the DEK.

In some examples, to get obliviousness as a property, it may require some client-side preprocessing before invoking the server's API, such as followed by some post-processing of the server's result. For example, this may be done to perform the blinding and de-blinding. A client-SDK would hide all of this from the end user and present a basic interface that takes the CRK and DEK IDs and returns the corresponding DEK.

In addition, note that multi-tenancy may also be supported such that different tenants supply different CRK IDs that corresponds to a different OPRF key (e.g., different OPRF secret).

Note also that alternative, optional, and/or additional REST (RESTful, (representational state transfer)) API may be used as follows:

(CRVK-Certificate)=GetRootVerificationKey(CRK_ID)

This method takes the CRK ID and returns a certificate for the "Customer Root Verification Key" (CRVK) corresponding to the CRK.

The certificate binds the CRKV to the CRK_ID with a digital signature

The CRVK can be used to prove returned keys are correctly computed

Blinded(DEK), Response=DeriveAndVerifyKey(CRK_ID, Blinded(DEK_ID), Challenge)

This method takes three inputs, the CRK ID, the blinded DEK ID, and a specially crafted "challenge". It enables the client to certify that the blinded key was computed correctly and using the correct CRK. This protects against MITM ("man in the middle," such as a middling device, etc.) attacks, server errors, defects, and memory corruption. Normally such a corruption would result in data loss such as based on encryption with a bad key. Note also that such novel solutions as presented herein can allow a client to validate that the KMS provided the correct key.

Figure 4C:
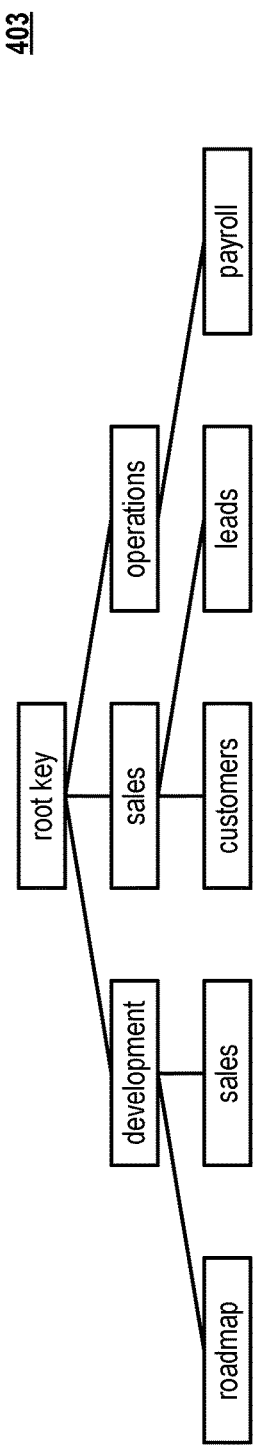
FIG. 4C is a diagram illustrating an embodiment of key hierarchies as may be used in accordance with a KMS according to various embodiments of the present invention.

FIG. 4C is a diagram illustrating an embodiment 403 of key hierarchies as may be used in accordance with a KMS according to various embodiments of the present invention. This diagram includes a hierarchy that includes a root key at a top parent level, then development, sales, and operations in a lower child level, and then roadmap and sales at a child level below development, customers and leads at a child level below sales, and payroll at a child level below operations. Each respective lower level in the hierarchy is based on any encrypted by the key associated with one or more upper levels. This enables hierarchical business cases, e.g., "Root Key" encrypts "Development Key" encrypts "Roadmap Key". For another example, "Root Key" encrypts "Sales Key" encrypts "Leads Key". Access to a parent level key grants access to lower level child keys. Note that only knowing a key not directly in the lineage doesn't allow for access to other keys not in that lineage. For example, having "Development Key" wouldn't grant access to "Payroll".

Note that implementing a hierarchy of keys requires multiple levels of wrapping. If the hierarchy is deep, this can potentially introduce performance and scaling concerns. For each level of depth in the hierarchy, the KMS may need to import another key from the database and perform another HSM operation. Note that such novel solutions as described herein with respect to servicing and operating a KMS may be applied and applicable to any type of key hierarchy including system that include only one level therein or N levels therein (where N is a positive integer greater than or equal to 2).

Figure 5:
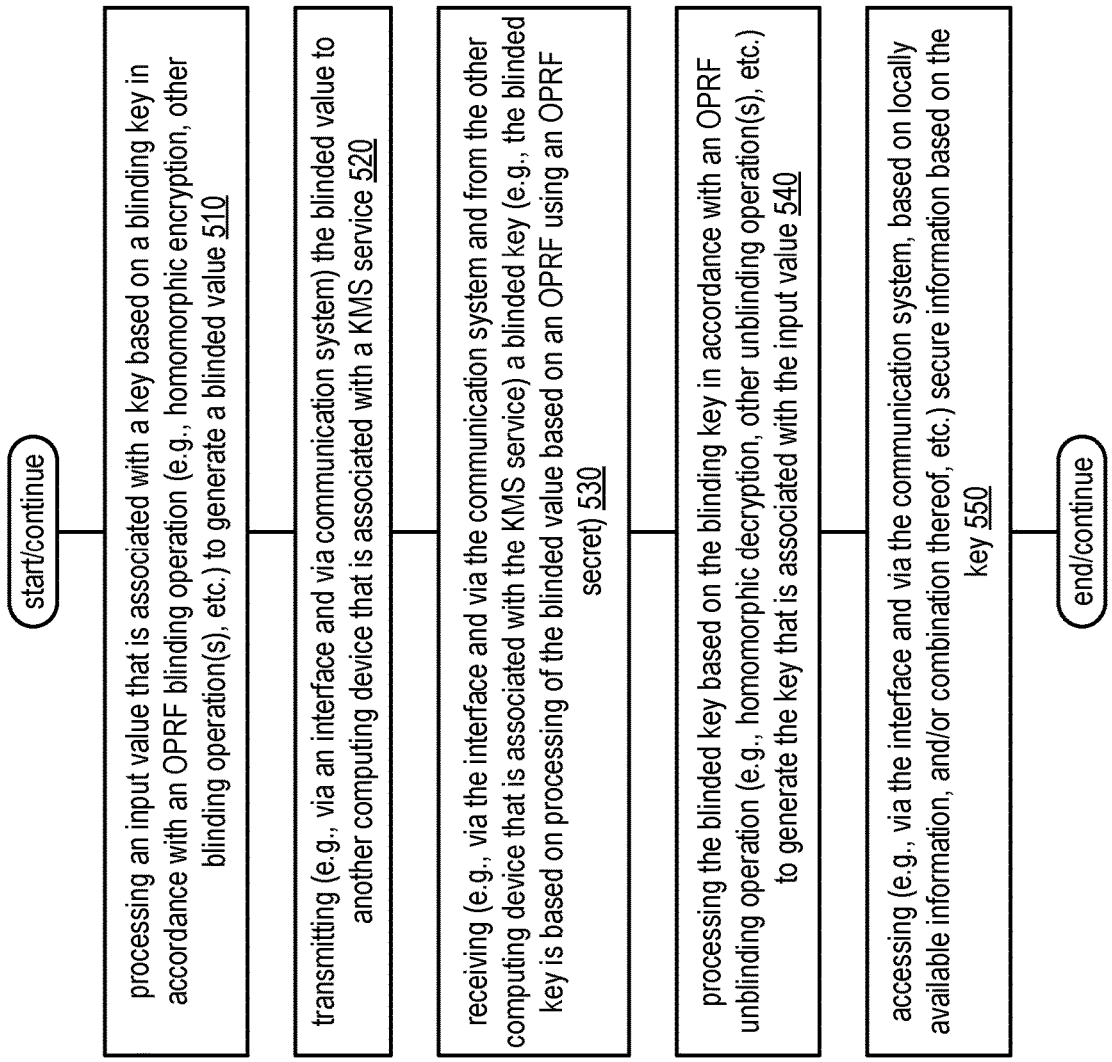
FIG. 5 is a diagram illustrating an embodiment of a method for execution by one or more computing devices according to various embodiments of the present invention.

FIG. 5 is a diagram illustrating an embodiment of a method 500 for execution by one or more computing devices according to various embodiments of the present invention. The method 500 begins in step 510 by processing an input value that is associated with a key based on a blinding key in accordance with an OPRF blinding operation (e.g., homomorphic encryption, one or more other blinding operations, etc.) to generate a blinded value. The method 500 continues in step 520 by transmitting (e.g., via an interface of the computing device that is configured to interface and communicate with a communication system) the blinded value to another computing device that is associated with a Key Management System (KMS) service.

The method 500 then operates in step 530 by receiving (e.g., via the interface and via the communication system and from the other computing device that is associated with the KMS service) a blinded key. Note that the blinded key is based on processing of the blinded value based on an Oblivious Pseudorandom Function (OPRF) using an OPRF secret. The method 500 then continues in step 540 by processing the blinded key based on the blinding key in accordance with an OPRF unblinding operation (e.g., homomorphic decryption, one or more other unblinding operations, etc.) to generate the key that is associated with the input value.

In some examples, the method 500 then operates in step 550 by accessing (e.g., via the interface and via the communication system, via the communication system, based on locally available and/or stored secure information, and/or combination thereof, etc.) secure information based on the key. For example, the secure information may include secure data that is key-protected or another key that is encrypted (e.g., a wrapped key).

In some examples, the input value is unknown to the other computing device. Also, in certain specific examples, the input value includes a key identifier that is associated with the key. Also, in some examples, the key is unknown to the other computing device. In addition, in certain specific examples, the key includes a Data Encryption Key (DEK) or a Key Encryption Key (KEK). Note that the OPRF secret is unknown to the computing device and is based on a Customer Root Key (CRK) that is associated with the computing device.

With respect to solutions using an OPRF such as described herein, note that the output of Pseudorandom Functions and Oblivious Pseudorandom Functions may be uncontrollable and appear completely random. In some examples, this can present a problem for key types that require a certain structures, formats, or properties (e.g., "Structured Keys"). For example, an RSA (Rivest-Shamir-Adleman) key consists of a set of numbers bearing a specific relation to each other. Similarly, an Elliptic Curve key consists of a number on a specific range as defined by the curve for which it is associated. The output of an OPRF is not guaranteed to produce outputs that will match the desired properties or required structures for keys. To support keys with defined structures, an OPRF-based Key Management System can be extended to support structured keys as described below.

For each structured key managed by the OPRF-based Key Management System, the Key Management System (KMS) will maintain:

1. Structured Key Parameters (one or more of: the key type and algorithm (RSA, DH, ElGamal, Elliptic Curve, etc.), key size (256-bits, 512-bits, 1024-bits, 2048-bits, etc.), modulus, generator, curve parameters)

2. A Generating Procedure (a deterministic algorithm to produce the structured key from the output of the OPRF, the structured key parameters, and optionally the encrypted parameters (if present)).

3. Optionally: Encrypted Parameters (may contain secret information or parameters encrypted under a key which can be produced from the OPRF output).

Upon the access of a structured key from the OPRF-based KMS, the Key Management System will return the blinded output of the OPRF (which is pseudorandom) as well as the structured key parameters, a generating procedure, and optionally encrypted parameters. The requester of the key uses the values returned by the KMS to produce the structured key as follows:

1. The requester obtains the output of the OPRF (e.g., by unblinding the blinded OPRF output returned from the KMS)

2. The requester determines the complete set of parameters from:
  a. The structured key parameters; and/or
  b. When encrypted parameters are returned, by further deriving a key from the OPRF output to decrypt the encrypted parameters to obtain the decrypted parameters 3. Using the complete set of parameters, and the OPRF output, following the returned "Generating Procedure" to produce the Structured Key The generating procedure may be something very straight forward, such as expanding the OPRF output to a specific length (e.g., using a mask generating function) and then taking the result modulo a prime modulus specific to the Diffie-Hellman or Elliptic Curve parameters, or it might be something more complex, such as using the OPRF output to seed a pseudorandom number generator (PRNG), using the PRNG to generate two large prime numbers, and using these two large prime numbers to produce an RSA modulus and then from the RSA modulus and the large prime numbers produce an RSA key pair. Note however, that a process like this can be resource intensive, as generating RSA keys and other structured keys can be expensive and time consuming. For these cases, it may be more efficient to utilize encrypted parameters. For example, the encrypted parameters might be the two large primes from which an RSA key can be derived, or it might even be the structured key itself. In this case, the generating procedure might specify how to derive a symmetric encryption key from the OPRF output, and then use this key to decrypt the encrypted parameters, and from these encrypted parameters, produce the structured key.

Figure 6:
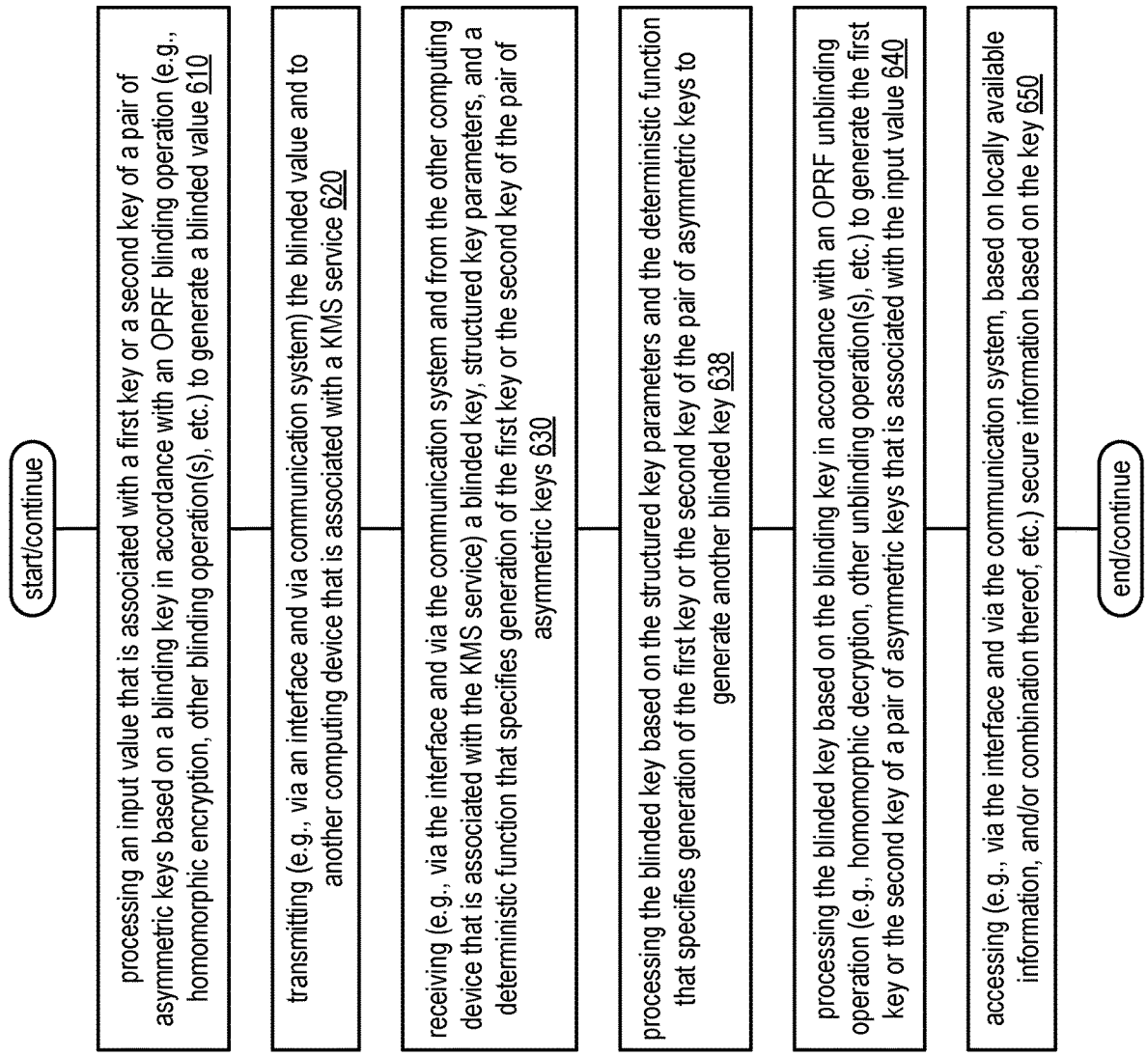
FIG. 6 is a diagram illustrating another embodiment of a method for execution by one or more computing devices according to various embodiments of the present invention.

FIG. 6 is a diagram illustrating another embodiment of a method 600 for execution by one or more computing devices according to various embodiments of the present invention. The method 600 begins in step 610 by processing an input value that is associated with a first key or a second key of a pair of asymmetric keys based on a blinding key in accordance with an OPRF blinding operation (e.g., homomorphic encryption, one or more other blinding operations, etc.) to generate a blinded value. The method 600 continues in step 620 by transmitting (e.g., via an interface of the computing device that is configured to interface and communicate with a communication system) the blinded value to another computing device that is associated with a Key Management System (KMS) service.

The method 600 begins in step 630 by receiving (e.g., via the communication system and from the other computing device) the blinded key that is associated with the KMS service, structured key parameters, and a deterministic function that specifies generation of the first key or the second key of the pair of asymmetric keys.

The method 600 continues in step 638 by processing the blinded key based on the structured key parameters and the deterministic function that specifies generation of the first key or the second key of the pair of asymmetric keys to generate another blinded key. The method 600 then operates in step 640 by processing the other blinded key based on the blinding key in accordance with an OPRF unblinding operation (e.g., homomorphic decryption, one or more other unblinding operations, etc.) to generate the first key or the second key of the pair of asymmetric keys that is associated with the input value.

In some examples, the method 600 then operates in step 650 by accessing (e.g., via the interface and via the communication system, based on locally available information, and/or combination thereof, etc.) secure information based on the key. For example, the secure information may include secure data that is key-protected or another key that is encrypted (e.g., a wrapped key).

Figure 7:
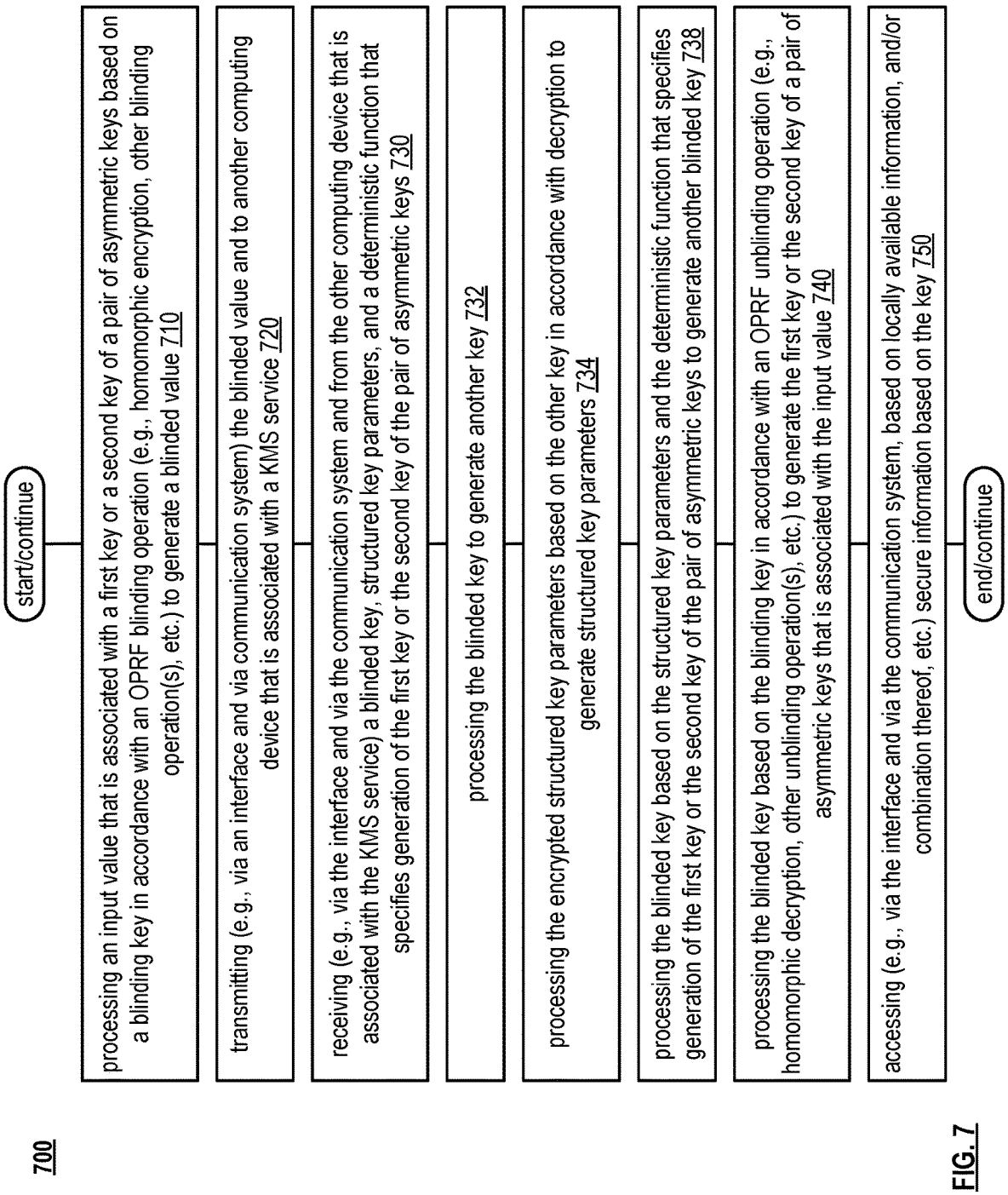
FIG. 7 is a diagram illustrating another embodiment of a method for execution by one or more computing devices according to various embodiments of the present invention.

FIG. 7 is a diagram illustrating another embodiment of a method 700 for execution by one or more computing devices according to various embodiments of the present invention. The method 700 begins in step 710 by processing an input value that is associated with a first key or a second key of a pair of asymmetric keys based on a blinding key in accordance with an OPRF blinding operation (e.g., homomorphic encryption, one or more other blinding operations, etc.) to generate a blinded value. The method 700 continues in step 720 by transmitting (e.g., via an interface of the computing device that is configured to interface and communicate with a communication system) the blinded value to another computing device that is associated with a Key Management System (KMS) service.

The method 700 begins in step 730 by receiving (e.g., via the communication system and from the other computing device) the blinded key that is associated with the KMS service, structured key parameters, and a deterministic function that specifies generation of the first key or the second key of the pair of asymmetric keys.

The method 700 continues in step 732 by processing the blinded key to generate another key. The method 700 operates in step 734 by processing the encrypted structured key parameters based on the other key in accordance with decryption to generate structured key parameters.

The method 700 continues in step 738 by processing the blinded key based on the structured key parameters and the deterministic function that specifies generation of the first key or the second key of the pair of asymmetric keys to generate another blinded key. The method 700 then operates in step 740 by processing the other blinded key based on the blinding key in accordance with an OPRF unblinding operation (e.g., homomorphic decryption, one or more other unblinding operations, etc.) to generate the first key or the second key of the pair of asymmetric keys that is associated with the input value.

In some examples, the method 700 then operates in step 750 by accessing (e.g., via the interface and via the communication system, based on locally available information, and/or combination thereof, etc.) secure information based on the key. For example, the secure information may include secure data that is key-protected or another key that is encrypted (e.g., a wrapped key). This may involve processing secure information using the key. For example, secure information may be accessed based on the key (e.g., such as the secure information being stored remotely in one or more other devices within the communication system and accessing that secure information via the interface and via the communication system). Alternatively, this may involve encrypting data using the key, and/or decrypting encrypted data using the key. In general, any of a variety of operations may be made using the key in accordance with operations related to secure information.

A common issue afflicting all Key Management Systems is the issue of integrity and authenticity for the provided keys. That is, if a requester obtains a key from a Key Management System, how can the requester be certain that the obtained key is indeed the correct one? This is a crucial problem, for if an invalid key is returned and used by the requester, it could lead to data loss. For example, if the requester encrypts data with an invalid key, and if in the future the requester is unable to obtain that invalid key in the future, then any data encrypted with that key may be unrecoverable.

The mathematics of many OPRF functions, however, enable a form of verification that can assert with a high degree of confidence to the requester, the authenticity and correctness of the output of the OPRF for the provided input, and then correspondingly, any key derived from the OPRF output can be presumed as legitimate and authentic. This can protect against both accidental, and purposeful corruption of key material provided by an OPRF-based KMS.

The particular method for verifying the keys recovered from an OPRF-based KMS depends on the underlying OPRF. For example: When using RSA-Blind Signatures to implement an OPRF, the OPRF-based KMS maintains an RSA private key which it uses to in the computation of the blinded OPRF output. If the requester knows the corresponding public key for the private key used by the KMS service, then the requester can validate either the blinded or unblinded OPRF output by performing an RSA signature verification operation on the output, given the input and the public key. If, on the other hand, the OPRF uses Diffie-Hellman exponentiation, or Elliptic Curve point multiplication to implement the OPRF, the requester can (with knowledge of the corresponding Diffie-Hellman or Elliptic Curve Public Key "g^x mod P") construct a "Challenge" for a given key recovery operation. Only with a negligible probability can the OPRF-based KMS Service compute a valid "Response" to the challenge that the requester will accept as valid. When the response is determined to be valid the requester can with a high confidence conclude that the OPRF output was correctly computed).

The requester's process for recovering a key and validating its correctness is as follows:

1. The requester determines the corresponding "public key" for the OPRF "private key" used by the OPRF-based KMS.

2. The requester verifies the public key is correct using some method, such as any one or more of:
   a. Extracting it from a validated digital certificate;
   b. Obtaining it from a trusted source; and/or
   c. Receiving it over a secure or authenticated channel.
   d. Generating both the public and private OPRF key before sending the private OPRF key to the KMS and storing the public key.

3. The requester constructs and sends an Oblivious Key Access Request (OKAR) to the KMS (as described in "Using an Oblivious Pseudorandom Function in a Key Management System")

4. If using an OPRF which enables the verification of the OPRF output directly using the OPRF public key, the requester goes to step 7 below.

5. If using an OPRF which requires a "challenge" to be generated and sent to the KMS, the requester generates a challenge, and either includes it in initial request (step 3) or sends a separate OKAR using the challenge value instead of the OPRF input value.

6. Requester determines whether the response to the challenge compares favorably to the OPRF input and OPRF output obtained from the response in step 3.

7. If the verification suggests that the OPRF output is correct, the OPRF output is used to derive a key and this key can be used by the requester, otherwise corrective actions are taken (in step 8).

8. If the verification procedure suggests the OPRF output is incorrect, corrective actions are taken. These include at least one of:
   a. Discarding the OPRF output any recovered or derived key;
   b. Performing another attempt at recovery (possibly against a different KMS unit); and/or
   c. Operations to identify which component or sub-component in a KMS service is failing or introducing incorrect values.

Figure 8:
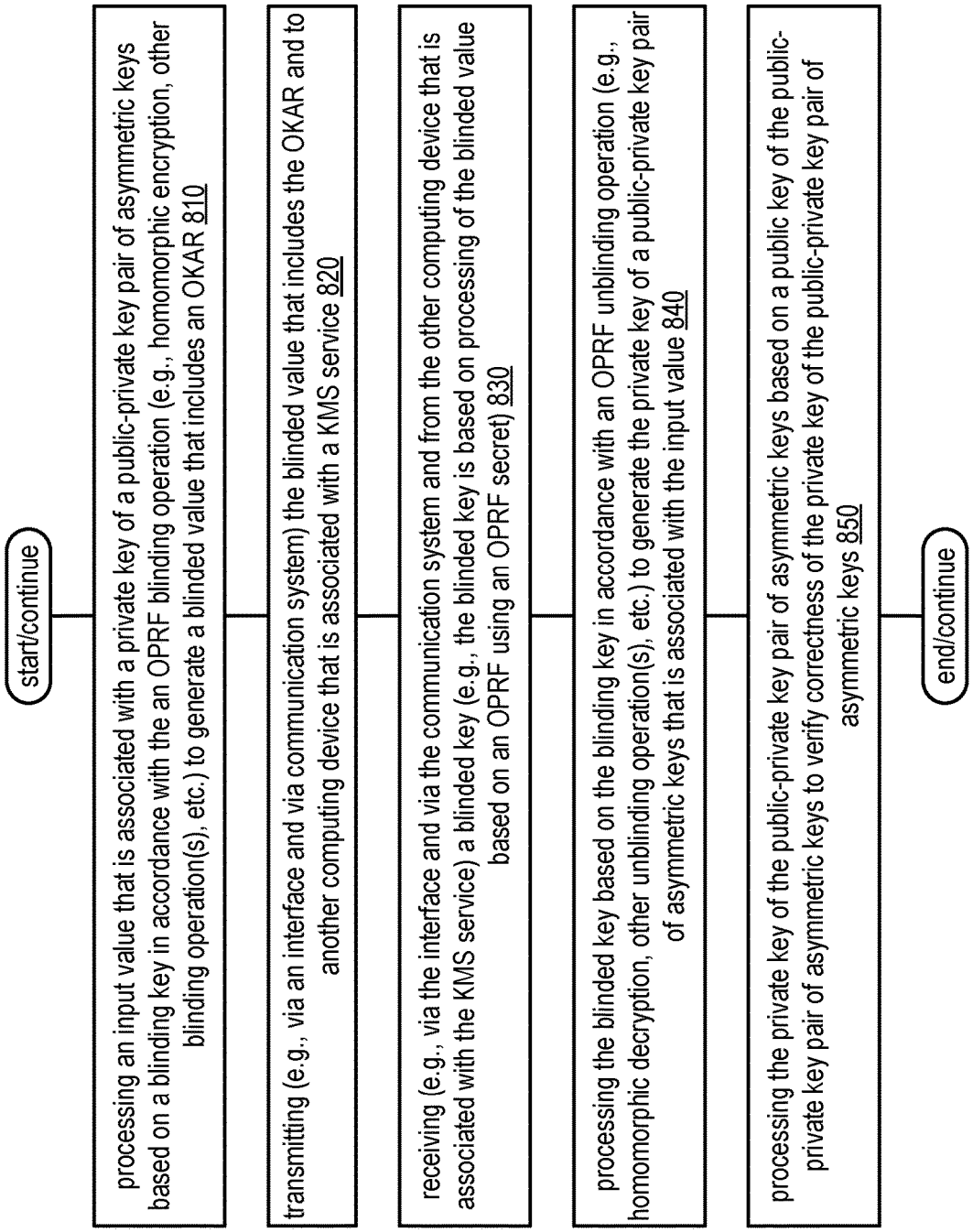
FIG. 8 is a diagram illustrating another embodiment of a method for execution by one or more computing devices according to various embodiments of the present invention.

FIG. 8 is a diagram illustrating another embodiment of a method 800 for execution by one or more computing devices according to various embodiments of the present invention. The method 800 begins in step 810 by processing another input value that is associated with a private key of a public-private key pair of asymmetric keys based on another blinding key in accordance with the OPRF blinding operation (e.g., homomorphic encryption, one or more other blinding operations, etc.) to generate another blinded value that includes an Oblivious Key Access Request (OKAR). The method 800 continues in step 820 by transmitting (e.g., via the communication system) the other blinded value that includes the OKAR to another computing device that is associated with the KMS service.

The method 800 then operates in step 830 by receiving (e.g., via the communication system and from the other computing device that is associated with the KMS service, another blinded key. Note that the other blinded key is based on processing of the other blinded value based on the OPRF using the OPRF secret.

The method 800 then continues in step 840 by processing the other blinded key based on the other blinding key in accordance with an OPRF unblinding operation (e.g., homomorphic decryption, one or more other unblinding operations, etc.) to generate the private key of the public-private key pair of asymmetric keys that is associated with the other input value. The method 800 then operates in step 850 by processing the private key of the public-private key pair of asymmetric keys based on a public key of the public-private key pair of asymmetric keys to verify correctness of the private key of the public-private key pair of asymmetric keys.

Figure 9:
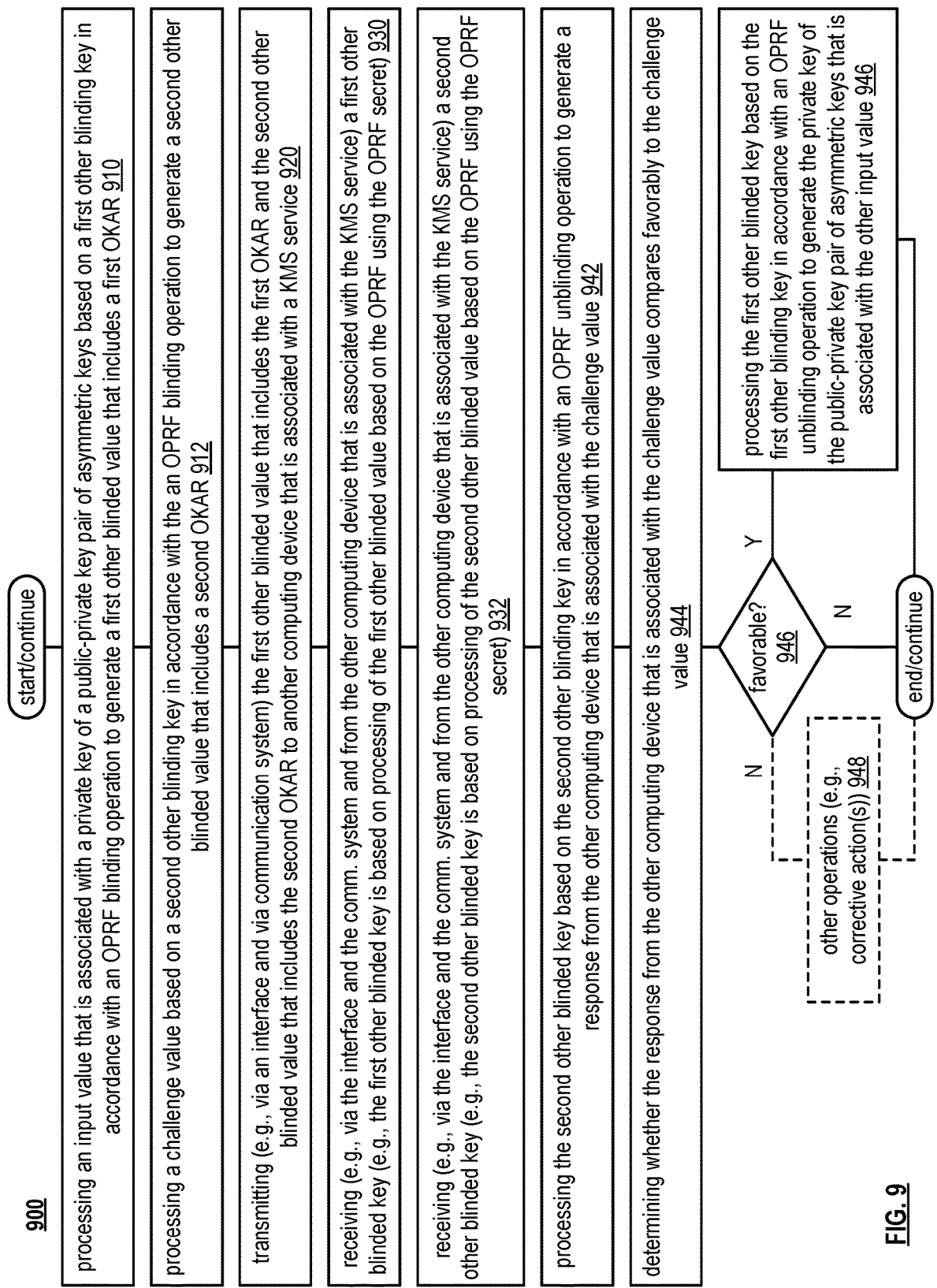
FIG. 9 is a diagram illustrating another embodiment of a method for execution by one or more computing devices according to various embodiments of the present invention.

FIG. 9 is a diagram illustrating another embodiment of a method 900 for execution by one or more computing devices according to various embodiments of the present invention. The method 900 begins in step 910 by processing an input value that is associated with a private key of a public-private key pair of asymmetric keys based on a first other blinding key in accordance with the OPRF blinding operation (e.g., homomorphic encryption, one or more other blinding operations, etc.) to generate a first other blinded value that includes a first Oblivious Key Access Request (OKAR). The method 900 continues in step 912 by processing a challenge value based on a second other blinding key in accordance with an OPRF blinding operation (e.g., homomorphic encryption, one or more other blinding operations, etc.) to generate a second other blinded value that includes a second OKAR.

The method 900 continues in step 920 by transmitting (e.g., via an interface and via a communication system) the first other blinded value that includes the first OKAR and the second other blinded value that includes the second OKAR to the other computing device that is associated with the KMS service.

The method 900 then operates in step 930 by receiving (e.g., via the communication system and from the other computing device that is associated with the KMS service) a first other blinded key. Note that the first other blinded key is based on processing of the first other blinded value based on the OPRF using the OPRF secret.

The method 900 also operates in step 932 by receiving (e.g., via the communication system and from the other computing device that is associated with the KMS service) a second other blinded key. Note that the second other blinded key is based on processing of the second other blinded value based on the OPRF using the OPRF secret.

The method 900 continues in step 942 by processing the second other blinded key based on the second other blinding key in accordance with an OPRF unblinding operation (e.g., homomorphic decryption, one or more other unblinding operations, etc.) to generate a response from the other computing device that is associated with the challenge value. The method 900 continues in step 944 by determining whether the response from the other computing device that is associated with the challenge value compares favorably to the challenge value.

Based on a determination that the response from the other computing device that is associated with the challenge value compares favorably to the challenge value (step 946), the method 900 continues and branches to step 946 by processing the first other blinded key based on the first other blinding key in accordance with an OPRF unblinding operation (e.g., homomorphic decryption, one or more other unblinding operations, etc.) to generate the private key of the public-private key pair of asymmetric keys that is associated with the other input value.

Alternatively, based on a determination that the response from the other computing device that is associated with the challenge value compares unfavorably to the challenge value (step 946), the method 900 continues and branches to end or continues.

Alternatively, based on a determination that the response from the other computing device that is associated with the challenge value compares unfavorably to the challenge value (step 946), the method 900 continues and branches to step 948 by performing one or more other operations (e.g., performing one or more corrective actions).

Figure 10:
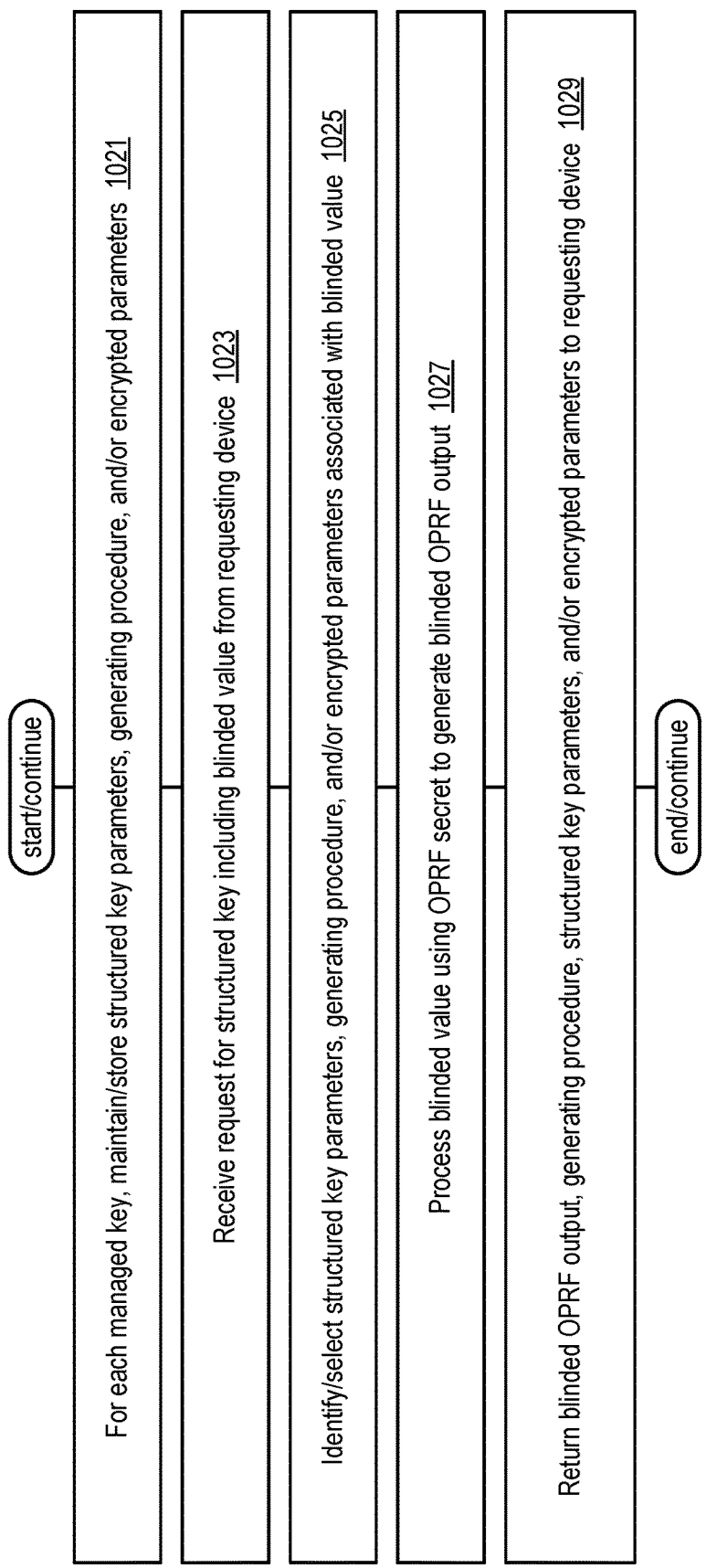
FIG. 10 is a diagram illustrating an embodiment of a method for recovering structured/asymmetric keys using an oblivious pseudorandom function, according to various embodiments of the present invention.

FIG. 10 is a diagram illustrating an embodiment of a method for recovering structured/asymmetric keys using an oblivious pseudorandom function, according to various embodiments of the present invention. The method 1000 begins in step 1021, where the following items are maintained for each structured key managed by a key management system: structured key parameters, generating procedures, and, optionally, encrypted parameters. The structured key parameters can include one or more of the key type and algorithm (RSA, DH, ElGamal, Elliptic Curve, the key size (256-bits, 512-bits, 1024-bits, 2048-bits, etc.), the modulus, a generator, and curve parameters. The generating procedure can include, for example, a deterministic algorithm to produce the structured key from: the output of the OPRF, the structured key parameters, and optionally, the encrypted parameters (if present). Encrypted parameters can contain secret information or parameters encrypted under a key, which can be produced from the OPRF output Some or all of the structured key parameters, generating procedures, and encrypted parameters can be stored in a local memory of a key management server, or in a remotely located storage device accessible to a key management server or service. In various embodiments, during an initial key generation process, the key management system, server, or service can generate any or all of structured key parameters, generating procedures, and encrypted parameters based on a type of key requested, based on an identity of the requestor, or otherwise. In some embodiments one or more of the structured key parameters, generating procedures, and encrypted parameters can be received from a requesting device during an initial or subsequent key generation process conducted on behalf of the requesting device. In some embodiments, a requesting device can provide permissions to the key management system, server, or service to accept one or more structured key parameters, generating procedures, and encrypted parameters from a third party. Any or all of the structured key parameters, generating procedures, and encrypted parameters can be generated or obtained based on a type of key being requested, e.g. RSA, Diffie-Hellman, Elliptical Curve, or the like.

Method 1000 continues, as illustrated by block 1023, with the key management system, server, or service receiving a request for a structured key from a requesting device. The request includes a blinded value. In at least one embodiment, the blinded value has been previously associated with particular structured key parameters, generating procedures, and/or encrypted parameters. This association can be established based on the identity of a requestor providing the blinded value, an address of the requestor providing the blinded value, using a Customer Root Key (CRK), using information encoded and passed between a requestor and a key management server, key management system, or key management service using an asymmetric key pair, a session key, or the like. As illustrated by block 1025, the key management server, key management system, or key management service identifies and selects the structured key parameters, generating procedure, and/or encrypted parameters based on the association between the blinded value included in the key request.

As illustrated by block 1027, the key management server, key management system, or key management service processes the blinded value suing an OPRF key/secret to generate a blinded OPRF output. Note that the blinded OPRF output is sometimes referred to herein as a blinded OPRF key, but the term "output" is used in this portion of the discussion to avoid potential confusion between the structured key being requested and the blinded output of the key management server, key management system, or key management service, which is later used by the requesting device to generate the requested key.

As illustrated by block 1029, the key management server, key management system, or key management service return the blinded OPRF output, the generating procedure, the structured key parameters, and any encrypted parameters to requesting device, which can use all of that information to generate the requested structured key.

Figure 11:
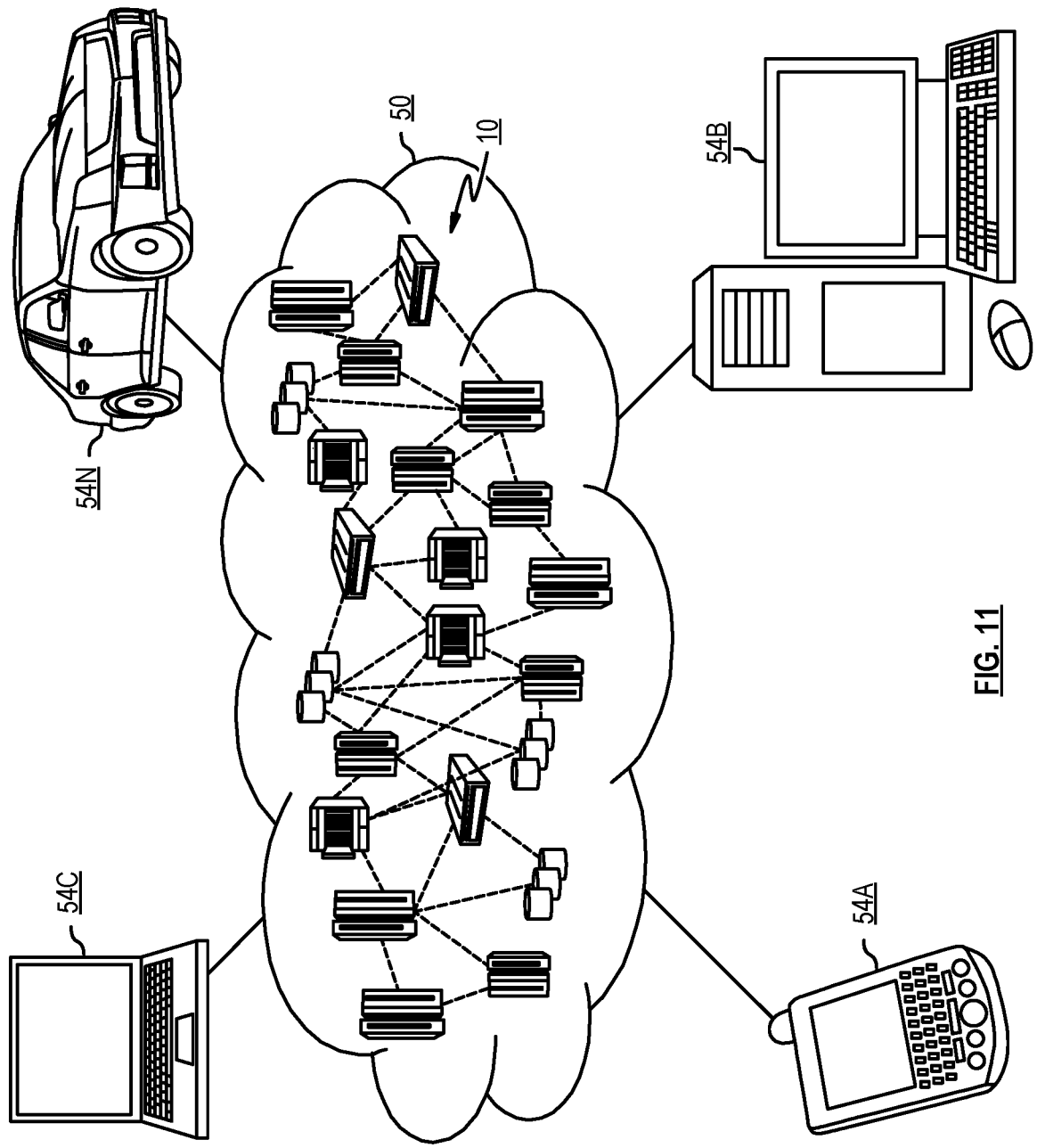
FIG. 11 depicts a cloud computing environment according to various embodiments of the present invention.

FIG. 11 depicts a cloud computing environment 1100 according to various embodiments of the present invention. FIG. 11 presents an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
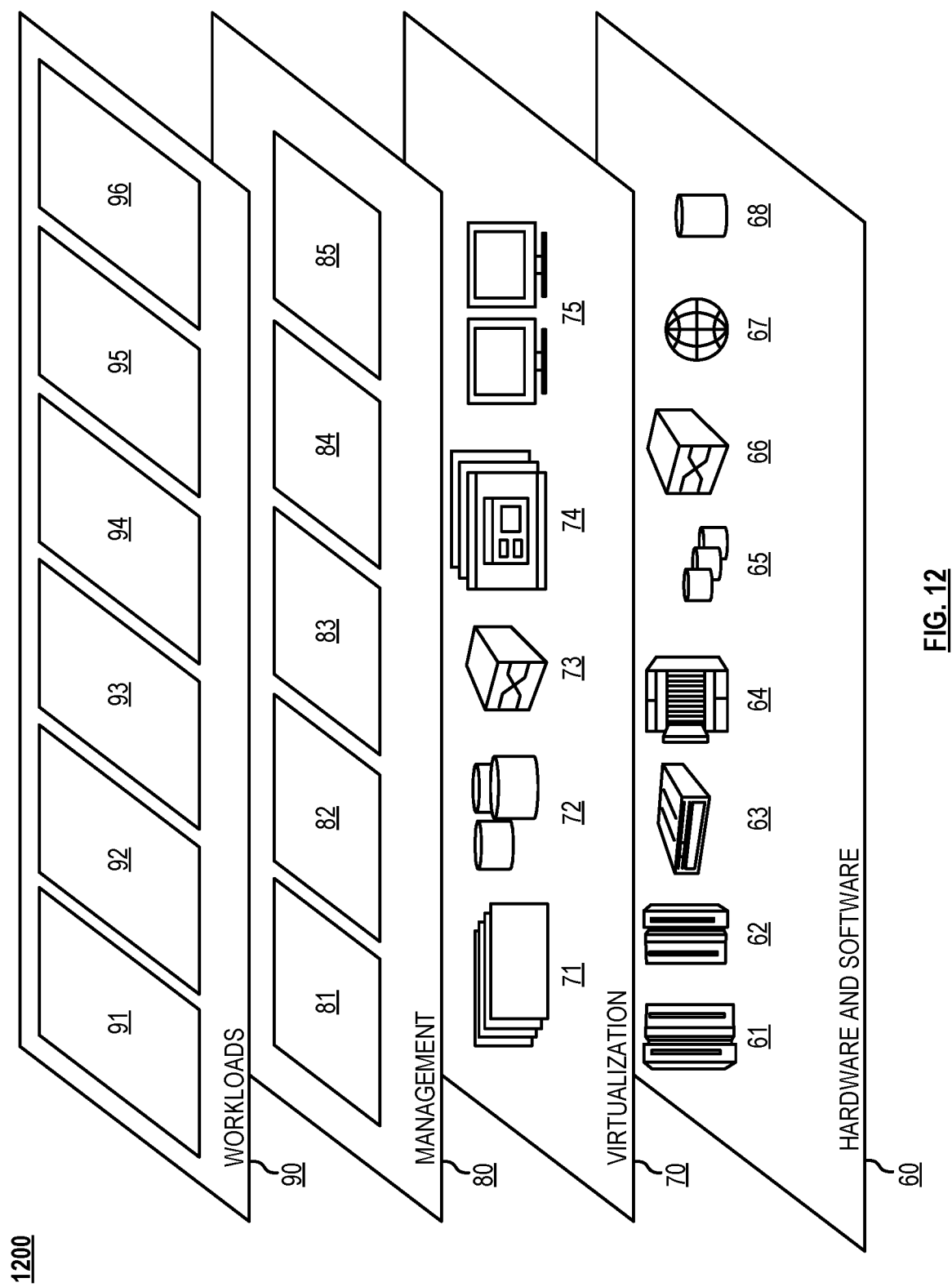
FIG. 12 depicts abstraction model layers according to various embodiments of the present invention.

FIG. 12 depicts abstraction model layers 1100 according to various embodiments of the present invention. Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, one or more hardware components can be implemented by utilizing the computing device 1301 of FIG. 13.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security, encryption, and key management related processing, and operations 96.

Figure 13:
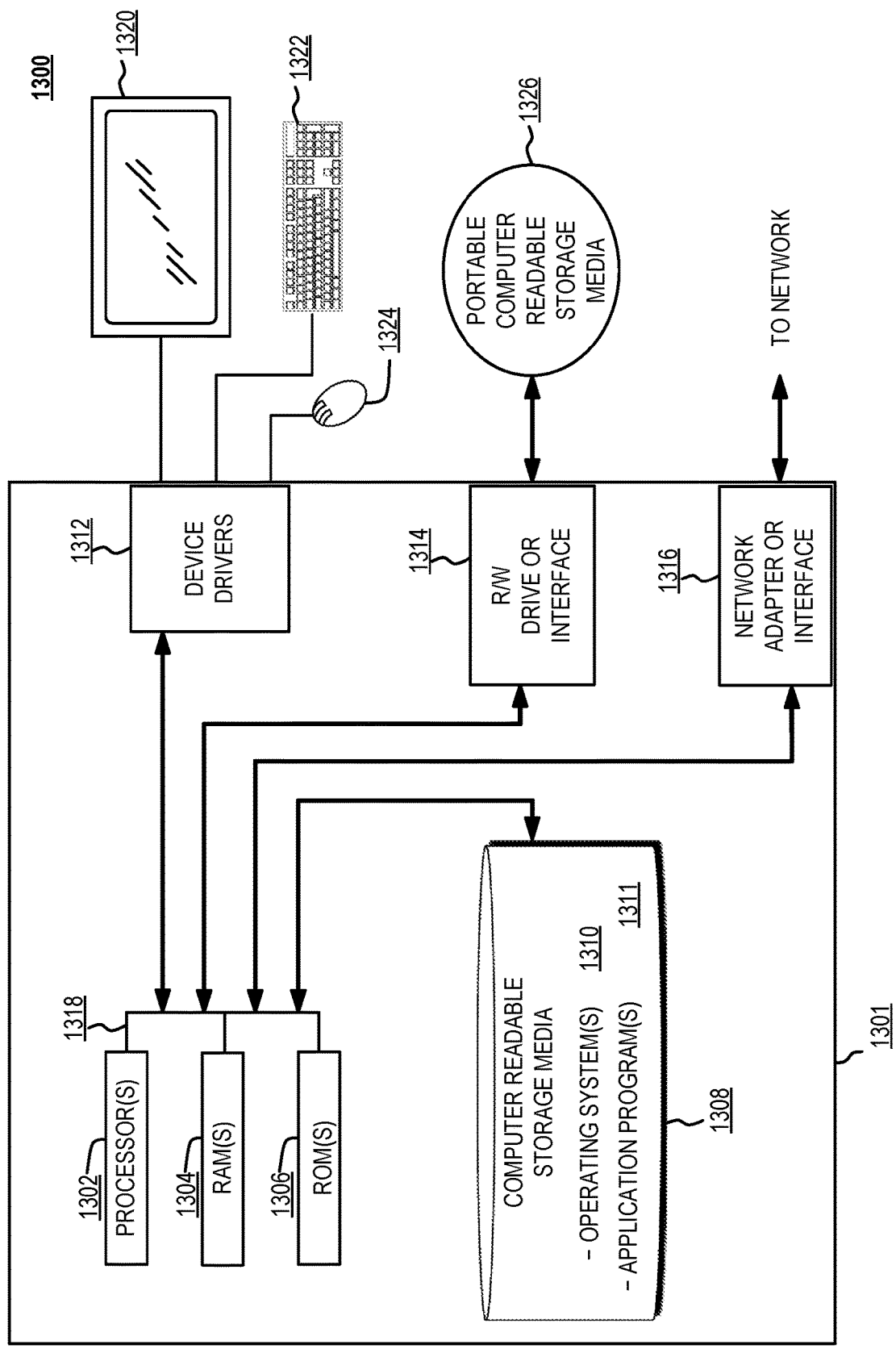
FIG. 13 depicts a block diagram of a computing device according to various embodiments of the present invention.

FIG. 13 depicts a block diagram 1300 of a computing device according to various embodiments of the present invention. FIG. 13 depicts a block diagram of components of a computing device 1301, which can be utilized to implement some or all of the cloud computing nodes 10, some or all of the computing devices 54A-N of FIG. 11, and/or to implement other computing devices described herein in accordance with an embodiment of the present invention. It should be appreciated that FIG. 13 provides only an illustration of one implementation and does not imply any limitations with regard to the environments in which different embodiments may be implemented. Many modifications to the depicted environment may be made.

Computing device 1301 can include one or more processors 1302, one or more computer-readable RAMs 1304, one or more computer-readable ROMs 1306, one or more computer readable storage media 1308, device drivers 1312, read/write drive or interface 1314, and network adapter or interface 1316, all interconnected over a communications fabric 1318. Communications fabric 1318 can be implemented with any architecture designed for passing data and/or control information between processors (such as microprocessors, communications and network processors, etc.), system memory, peripheral devices, and any other hardware components within the system.

One or more operating systems 1310 and/or application programs 1311, such as network application server software 67 and database software 68 of FIG. 12, are stored on one or more of the computer readable storage media 1308 for execution by one or more of the processors 1302 via one or more of the respective RAMs 1304 (which typically include cache memory). In the illustrated embodiment, each of the computer readable storage media 1308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 1301 can also include a R/W drive or interface 1314 to read from and write to one or more portable computer readable storage media 1326. Application programs 1311 on computing devices 1301 can be stored on one or more of the portable computer readable storage media 1326, read via the respective R/W drive or interface 1314 and loaded into the respective computer readable storage media 1308.

Computing device 1301 can also include a network adapter or interface 1316, such as a TCP/IP adapter card or wireless communication adapter. Application programs 1311 on computing devices 54A-N can be downloaded to the computing device from an external computer or external storage device via a network (for example, the Internet, a local area network or other wide area networks or wireless networks) and network adapter or interface 1316. From the network adapter or interface 1316, the programs may be loaded into the computer readable storage media 1308. The network may comprise copper wires, optical fibers, wireless transmission, routers, firewalls, switches, gateway computers and edge servers.

Computing device 1301 can also include a display screen 1320, a keyboard or keypad 1322, and a computer mouse or touchpad 1324. Device drivers 1312 interface to display screen 1320 for imaging, to keyboard or keypad 1322, to computer mouse or touchpad 1324, and/or to display screen 1320 for pressure sensing of alphanumeric character entry and user selections. The device drivers 1312, R/W drive or interface 1314, and network adapter or interface 1316 can comprise hardware and software stored in computer readable storage media 1308 and/or ROM 1306.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device configured to implement a key management system (KMS), the computing device comprising:
   an interface configured to interface and communicate with a communication system;
   memory that stores operational instructions; and
   processing circuitry operably coupled to the interface and to the memory, wherein the processing circuitry is configured to execute the operational instructions to:
   maintain structured key parameters associated with a structured key;
   maintain a generating procedure associated with the structured key, the generating procedure configured to produce the structured key from an Oblivious Pseudorandom Function (OPRF) output, and the structured key parameters;
   receive, from a requesting computing device, a blinded value associated with the structured key;
   process the blinded value using an OPRF secret to generate a blinded OPRF output; and
   return the blinded OPRF output, the generating procedure, and the structured key parameters to the requesting computing device, for generation of the structured key by the requesting computing device.

2. The computing device of claim 1, wherein the processing circuitry is further configured to execute the operational instructions to:
   maintain encrypted parameters associated with the structured key; and
   return the encrypted parameters, the OPRF output, the generating procedure, and the structured key parameters to the requesting computing device for generation of the structured key by the requesting computing device.

3. The computing device of claim 2, wherein:
the encrypted parameters include the structured key; and
the generating procedure is further configured to:
- derive a symmetric encryption key from the OPRF output;
- use the symmetric encryption key to decrypt the encrypted parameters; and
- produce the structured key from the encrypted parameters.

4. The computing device of claim 2, wherein:
the encrypted parameters include large primes associated with a Rivest, Shamir, and Adelman (RSA) key.

5. The computing device of claim 1, wherein:
the structured key parameters include one or more of a key type, an algorithm associated with a key type, a key size, a modulus, a key generator, or curve parameters.

6. The computing device of claim 1, wherein the generating procedure is further configured to:
use the OPRF output to seed a deterministic key generator.

7. The computing device of claim 1, wherein the generating procedure is further configured to:
- expand the OPRF output to a specific length to produce an expanded result; and
- take the expanded result modulo a prime modulus specific to one of Diffie-Hellman parameters or Elliptic Curve parameters.

8. A method for use in a key management system (KMS), the method comprising:
- maintaining, by a server device including a processor and associated memory, structured key parameters associated with a structured key;
- maintaining, by the server device, a generating procedure associated with the structured key, the generating procedure configured to produce the structured key from an Oblivious Pseudorandom Function (OPRF) output, and the structured key parameters;
- receiving, by the server device from a requesting computing device, a blinded value associated with the structured key, wherein the blinded value is generated at the requesting computer device based on an input value unknown to the server device;
- processing, by the server device, the blinded value using an OPRF secret to generate a blinded OPRF output, wherein the OPRF secret is unknown to the requesting computing device; and
- returning, by the server device, the blinded OPRF output, the generating procedure, and the structured key parameters to the requesting computing device, for generation of the structured key by the requesting computing device.

9. The method of claim 8, the method further comprising:
- maintaining, by the server device, encrypted parameters associated with the structured key; and
- returning the encrypted parameters, the OPRF output, the generating procedure, and the structured key parameters to the requesting computing device for generation of the structured key by the requesting computing device.

10. The method of claim 9, wherein:
the encrypted parameters include the structured key; and
the generating procedure is further configured to:
- derive a symmetric encryption key from the OPRF output;
- use the symmetric encryption key to decrypt the encrypted parameters; and
- produce the structured key from the encrypted parameters.

11. The method of claim 9, wherein:
the encrypted parameters include large primes associated with a Rivest, Shamir, and Adelman (RSA) key.

12. The method of claim 8, wherein:
the structured key parameters include one or more of a key type, an algorithm associated with a key type, a key size, a modulus, a key generator, or curve parameters.

13. The method of claim 8, wherein the generating procedure is further configured to:
use the OPRF output to seed a deterministic key generator.

14. The method of claim 8, wherein the generating procedure is further configured to:
- expand the OPRF output to a specific length to produce an expanded result; and
- take the expanded result modulo a prime modulus specific to one of Diffie-Hellman parameters or Elliptic Curve parameters.

15. A method comprising:
- receiving, at a key management server configured to implement a key management system (KMS), a blinded value associated with a structured key managed by the key management server, the blinded value received from a requesting device via a communications network;
- obtaining, by the key management server, a generating procedure associated with the structured key;
- obtaining, by the key management server, structured key parameters associated with the structured key;
- processing, by key management server, the blinded value using an Oblivious Pseudorandom Function (OPRF) secret to generate a blinded OPRF output; and
- returning the blinded OPRF output, the generating procedure, and the structured key parameters to the requesting device, for generation of the structured key by the requesting device.

16. The method of claim 15, the method further comprising:
- obtaining, by the key management server, encrypted parameters associated with the structured key; and
- returning the encrypted parameters, the OPRF output, the generating procedure, and the structured key parameters to the requesting device for generation of the structured key by the requesting device,
- wherein the blinding value is generated at the requesting device based on an input value unknown to the key management server, and the OPRF secret is unknown to the requesting device.

17. The method of claim 16, wherein:
the encrypted parameters include the structured key; and
the generating procedure is further configured to:
- derive a symmetric encryption key from the OPRF output;
- use the symmetric encryption key to decrypt the encrypted parameters; and
- produce the structured key from the encrypted parameters.

18. The method of claim 15, wherein obtaining at least one of the structured key parameters or the generating procedure includes:
selecting at least one of the structured key parameters or the generating procedure based, at least in part, on the blinded value.

19. The method of claim 15, wherein obtaining at least one of the structured key parameters or the generating procedure includes:
    selecting at least one of the structured key parameters or the generating procedure based, at least in part, on a source of the blinded value.

20. The method of claim 15, wherein:
    the structured key parameters include one or more of a key type, an algorithm associated with a key type, a key size, a modulus, a key generator, or curve parameters.

* * * * *